United States Patent
Makita

(10) Patent No.: US 7,500,093 B2
(45) Date of Patent: Mar. 3, 2009

(54) STARTUP PROGRAM EXECUTION METHOD, DEVICE, STORAGE MEDIUM, AND PROGRAM

(75) Inventor: Satoshi Makita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 11/141,136

(22) Filed: May 31, 2005

(65) Prior Publication Data

US 2006/0195686 A1    Aug. 31, 2006

(30) Foreign Application Priority Data

Feb. 28, 2005    (JP)    ............... 2005-052662

(51) Int. Cl.
- G06F 9/00    (2006.01)
- G06F 9/24    (2006.01)
- G06F 15/177  (2006.01)

(52) U.S. Cl. ................. 713/2; 713/1; 713/100
(58) Field of Classification Search ....... 713/1, 713/2, 100
See application file for complete search history.

(56) References Cited

U.S. PATENT DOCUMENTS

| | | | |
|---|---|---|---|
| 5,689,726 A * | 11/1997 | Lin ............... | 710/10 |
| 6,401,198 B1 * | 6/2002 | Harmer et al. ........ | 713/1 |
| 6,715,072 B1 * | 3/2004 | Kobayashi ........... | 713/100 |
| 2004/0236960 A1 * | 11/2004 | Zimmer et al. ....... | 713/200 |
| 2005/0038981 A1 * | 2/2005 | Connor et al. ....... | 713/1 |
| 2006/0195685 A1 * | 8/2006 | Kawabe .............. | 713/1 |

FOREIGN PATENT DOCUMENTS

| | | |
|---|---|---|
| JP | 63175955 | 7/1988 |
| JP | 2000215065 | 8/2000 |
| JP | 2003-150455 | 5/2003 |

* cited by examiner

*Primary Examiner*—Thomas Lee
*Assistant Examiner*—Michael J Brown
(74) *Attorney, Agent, or Firm*—Greer, Burns & Crain, Ltd.

(57) ABSTRACT

A pre-startup process unit responds to a first read request from an upper-level system to a storage medium of a device by reading out, instead of a startup sector of the storage medium storing a startup program, a provisional startup sector storing an arbitrary program so as to execute the arbitrary program. A startup unit responds to a subsequent read request from the upper-level system according to execution of the arbitrary program by reading out the startup sector, and executes the startup program so as to start up an OS. The provisional startup sector storing the arbitrary program is disposed in a particular area of the storage medium which is inaccessible from the OS, a system area of the storage medium which can be accessed only from the device, or an area of a non-volatile memory provided in the device.

18 Claims, 34 Drawing Sheets

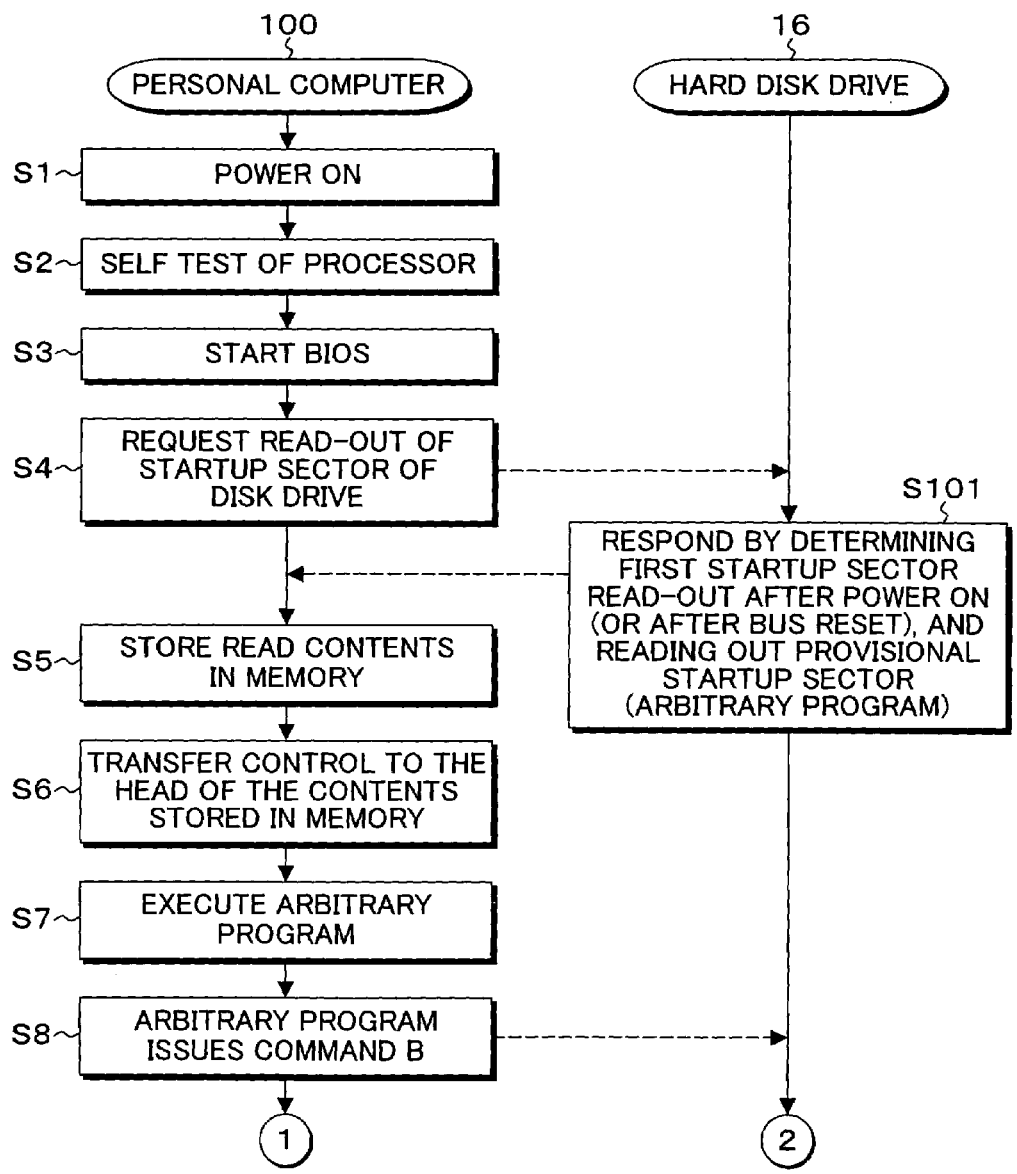

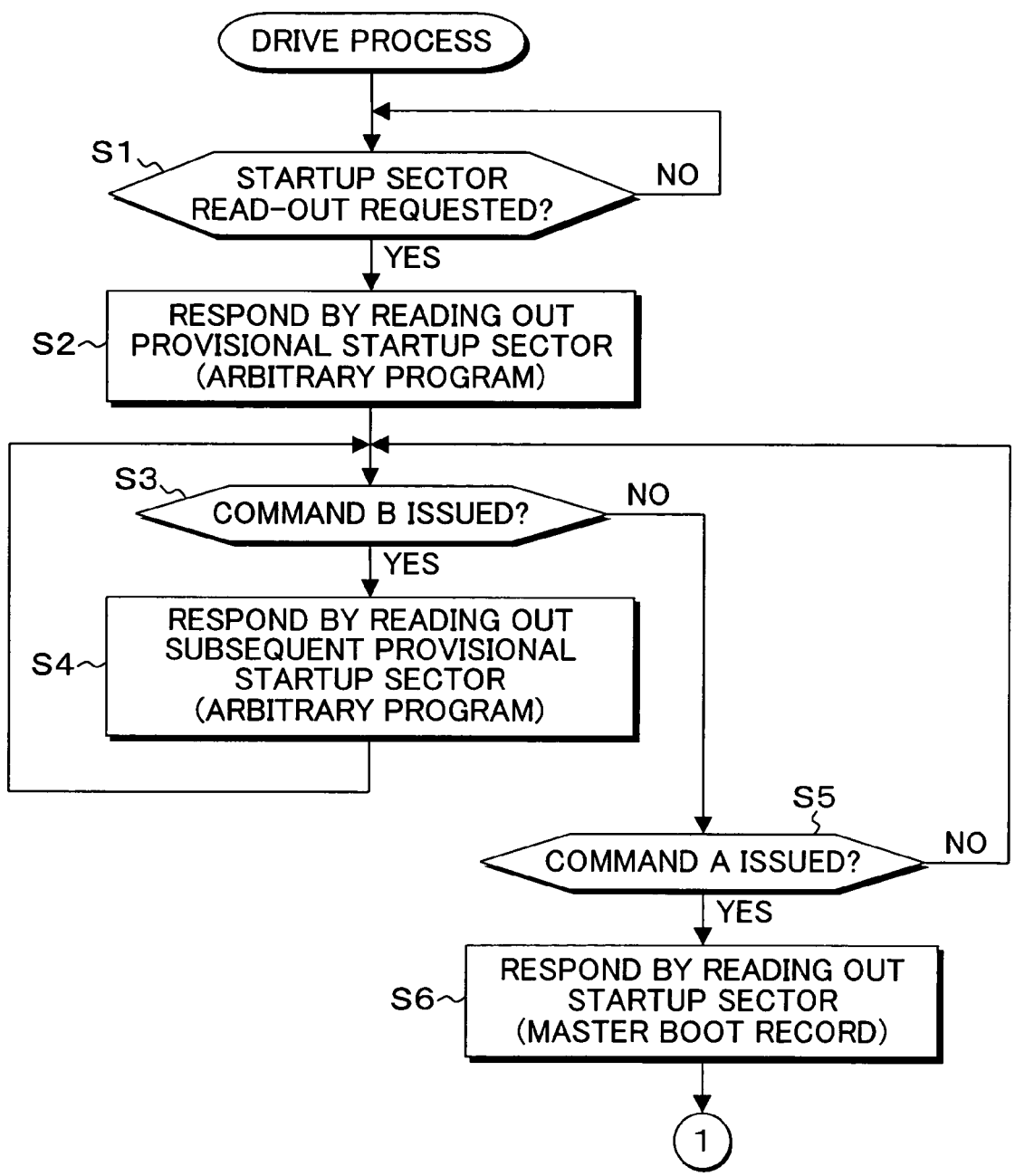

STARTUP PROGRAM EXECUTION METHOD, DEVICE, STORAGE MEDIUM, AND PROGRAM

This application is a priority based on prior application No. JP 2005-526627, filed Feb. 28, 2005, in Japan.

BACKGROUND OF THE INVENTION

1. Field of the Invention

The present invention relates to startup program execution methods, devices, storage mediums, and programs for starting up an OS through a boot process, and in particular, relates to startup program execution methods, devices, storage mediums, and programs for executing an arbitrary program before start-up of an OS.

2. Description of the Related Arts

Conventionally, in a personal computer which is a PC/AT compatible machine, as shown in FIG. 1, a hard disk drive 202 is built in a personal computer 200, and in accordance with needs, for example, a floppy (R) disk drive 204, a magneto-optical disk drive 206, a CD-ROM drive 208, and a USB memory 210 are externally connected.

FIG. 2 is a disk layout of a conventional hard disk drive, wherein a master boot record (MBR) 212 is present in the head sector having the head logical block address LBA0 of the disk, and a bootstrap loader, partition tables, and a boot signature are stored therein. Meanwhile, a boot program is stored in a boot sector 214 which is the head sector of a particular partition.

FIG. 3 is a disk layout of a floppy (R) disk for start-up, wherein no bootstrap loader is present, and a boot program is present in a boot sector 216. MOs, CD-ROMs, USB memories, etc. are recorded in the format of either FIG. 2 or FIG. 3.

FIG. 4 is a flow chart of a boot process targeting the disk layout of FIG. 2. In FIG. 4, when the power is turned on in a step S1, after self test of the processor is performed in a step S2, the BIOS (Basic Input Output System) is started in a step S3, the BIOS reads the contents recorded in the head sector of the disk at LBA0 as much as the sector length, generally 512 bytes, in a step S4, and stores them in a memory serving as the main storage of the personal computer in a step S5. Then, the BIOS transfers control to the head position of the stored data in a step S6. When control is transferred, the program stored in the position is executed. In the case of a hard disk drive, a bootstrap loader is recorded from the head of LBA0, therefore the bootstrap loader operates so as to load a boot sector, and the boot program is executed. The boot program loads an OS stored in the disk into the memory and executes it, thereby starting up the OS. Note that, in the case of a floppy (R) disk, a boot program is recorded from the head of LBA0, therefore the boot program is executed from the beginning. By the way, recently, in order to enhance the security of personal computers, password authentication is requested with respect to storage medium access by an application after the OS is started up. However, rather than taking measures in the application level, fairly high security can be ensured if a password authentication process or the like can be executed before the OS starts up after the power of the computer is turned on.

However, in the conventional boot process, when the power is turned on, the BIOS reads out the head sector (LBA0) of the disk drive and stores it in a memory, and transfers control to the head position of the stored contents so as to operate the bootstrap loader; therefore, when an arbitrary program is desired to be executed upon start-up, either change of the BIOS or change of the bootstrap loader has to be carried out. Note that, in the case of a floppy (R) disk, since no bootstrap loader is present, the boot program has to be changed. However, change of BIOSes has to be ordered to BIOS makers, thereby causing a problem of cost. Moreover, change of the contents of the head sector (LBA0) influences startup of the OS, thereby involving a problem of high risk.

SUMMARY OF THE INVENTION

According to the present invention, there are provide a startup program execution method, a device, a storage medium, and a program for enabling execution of an arbitrary program, such as that of security, prior to OS start-up, without changing the BIOS of an upper-level system and/or the startup sector (LBA0) of a storage medium.

The present invention provides a startup program execution method. The startup program execution method of the present invention is characterized by comprising a pre-startup process step of responding to a first read request from an upper-level system to a storage medium of a device by reading out, instead of a startup sector of the storage medium storing a startup program, a provisional startup sector storing an arbitrary program 90 so as to execute the arbitrary program; and a startup step of responding to a subsequent read request from the upper-level system according to execution of the arbitrary program by reading out the startup sector, and starting up an OS by executing the startup program.

Herein, the arbitrary program stores a code for reading out the startup sector when execution thereof is finished, deploying it in a memory, and transferring control to the head part thereof. The provisional startup sector storing the arbitrary program is disposed in a particular area of a storage medium which is inaccessible from an OS, a system area of the storage medium which can be accessed only from the device, or an area of a non-volatile memory provided in the device.

The startup program is a bootstrap loader, which is stored in a startup sector of a storage medium and corresponding to PC/AT compatible, and a boot program enabled in a partition startup sector specified by the bootstrap loader; or the startup program is a boot program stored in a boot sector serving as a startup sector of a storage medium.

If the arbitrary program is divided and stored in a plurality of provisional startup sectors disposed in a single area of the device, in the pre-startup process step, the disposed number of the provisional startup sectors is managed, and responses to a plurality of readout requests from an upper-level system are made by sequentially reading out the provisional startup sectors as much as the disposed number so as to execute the arbitrary program.

If the arbitrary program is divided and stored in a plurality of provisional startup sectors disposed in different areas of the device, in the pre-startup process step, the order of the provisional startup sectors is managed, and responses to a plurality of readout requests from the upper-level system after the power is turned on are made by reading out the plurality of provisional startup sectors in accordance with the managed order so as to execute the arbitrary program.

In the pre-startup process step, furthermore, a plurality of provisional startup sectors are disposed in each of the different areas of the device and the disposed number is managed, and responses to a plurality of readout requests from the upper-level system are made by sequentially reading out the provisional startup sectors as much as the disposed number in each of the different disposed areas so as to execute the arbitrary program.

The arbitrary programs stored in the plurality of provisional startup sectors are divided programs of one arbitrary program, or a plurality types of arbitrary programs.

If the arbitrary program is divided and stored in a plurality of provisional startup sectors, the arbitrary program issues a command A for requesting readout of the startup sector when execution thereof is finished; and, in the startup step, when the command A from the upper-level system is received after the readout response according to the pre-startup process step, a response is made by reading out the startup sector so as to execute the startup program.

If the arbitrary program is divided and stored in a plurality of provisional startup sectors, the arbitrary program issues a command B for requesting readout of a subsequent provisional startup sector when execution thereof is finished;

in the pre-startup process step, after a response to a first read request from an upper-level system after the power is turned on is made by reading out the provisional startup sector at the head, a response is made when the command B from the upper-level system is received by reading out a subsequent provisional startup sector; and, in the startup step, when the command B is received, it is determined that there is no subsequent provisional startup sector so as to make a response by reading out the startup sector.

If the arbitrary program is divided and stored in a plurality of provisional startup sectors, each of the plurality of arbitrary programs except for the last one issues a first command B for requesting readout of a subsequent arbitrary program when execution thereof is finished, and the last arbitrary program issues a second command A for requesting readout of the startup sector when execution thereof is finished;

in the pre-startup process step, after a response to a first read request from an upper-level system after the power is turned on is made by reading out the provisional startup sector at the head, a response is made when the first command B from the upper-level system is received by reading out a subsequent provisional startup sector; and, in the startup step, when the second command A from the upper-level system with respect to a readout response according to the pre-startup process step is received, a response is made by reading out the startup sector.

In the pre-startup process step, when a response to a first read request from an upper-level system after the power is turned on is made by reading out the provisional startup sector storing the arbitrary program, a response is made by copying a partition table from the startup sector. The drive includes a disk drive and a memory drive.

The present invention provides a device for accessing a storage medium according to an instruction from an upper-level system. The device of the present invention is characterized by comprising a pre-startup process unit for responding to a first read request from an upper-level system by reading out, instead of a startup sector storing a startup program, a provisional startup sector storing an arbitrary program so as to execute the arbitrary program; and a startup unit for responding to a subsequent read request from the upper-level system according to execution of the arbitrary program by reading out the startup sector, and starting up an OS by executing the startup program.

The present invention provides a storage medium to be accessed from a device in response to an instruction of an upper-level system. The storage medium of the present invention is characterized by having a provisional startup sector storing an arbitrary program to be read out instead of a startup sector storing a startup program in response to a first read request from an upper-level system.

The present invention provides a program to be executed by a computer of a device for accessing a storage medium in response to an instruction of an upper-level system. The program of the present invention is characterized by causing the computer of the device connected to the upper-level system to execute a pre-startup process step of responding to a first read request from an upper-level system by reading out, instead of a startup sector storing a startup program, a provisional startup sector storing an arbitrary program so as to execute the arbitrary program; and a startup step of responding to a subsequent read request from the upper-level system according to execution of the arbitrary program by reading out the startup sector, and starting up an OS by executing the startup program.

According to the present invention, when, without changing the contents of the BIOS of an upper-level system and/or the startup sector of a storage medium, for example, the head sector (LBA0), a response is made by reading out a provisional startup sector storing an arbitrary program through a boot process after the power of the upper-level system is turned on so as to executed the arbitrary program, the arbitrary program can be executed before the OS is started up. That is, before the OS is started up through the boot process of the upper-level system, without changing the contents of the BIOS of the upper-level system and/or the startup sector of the storage medium, the startup drive per se can independently read out the arbitrary program, and cause the upper-level system to execute the arbitrary program. Moreover, when a plurality of provisional startup sectors are disposed, an arbitrary program exceeding the sector size can be divided and stored, the size of the arbitrary program can be arbitrarily determined, and a plurality types of arbitrary programs can be stored and executed before OS start-up. The above and other objects, features, and advantages of the present invention will become more apparent from the following detailed description with reference to the drawings.

BRIEF DESCRIPTION OF THE DRAWINGS

FIGS. 25A and 25B are time charts of a control process according to the present invention for reading out a subsequent provisional startup sector by means of a command B, and switching to readout of the startup sector at LBA0 by means of command A;

FIGS. 26A and 26B are flow charts of a drive process corresponding to the control process of FIGS. 25A and 25B;

DETAILED DESCRIPTION OF THE PREFERRED EMBODIMENTS

Figure 1:
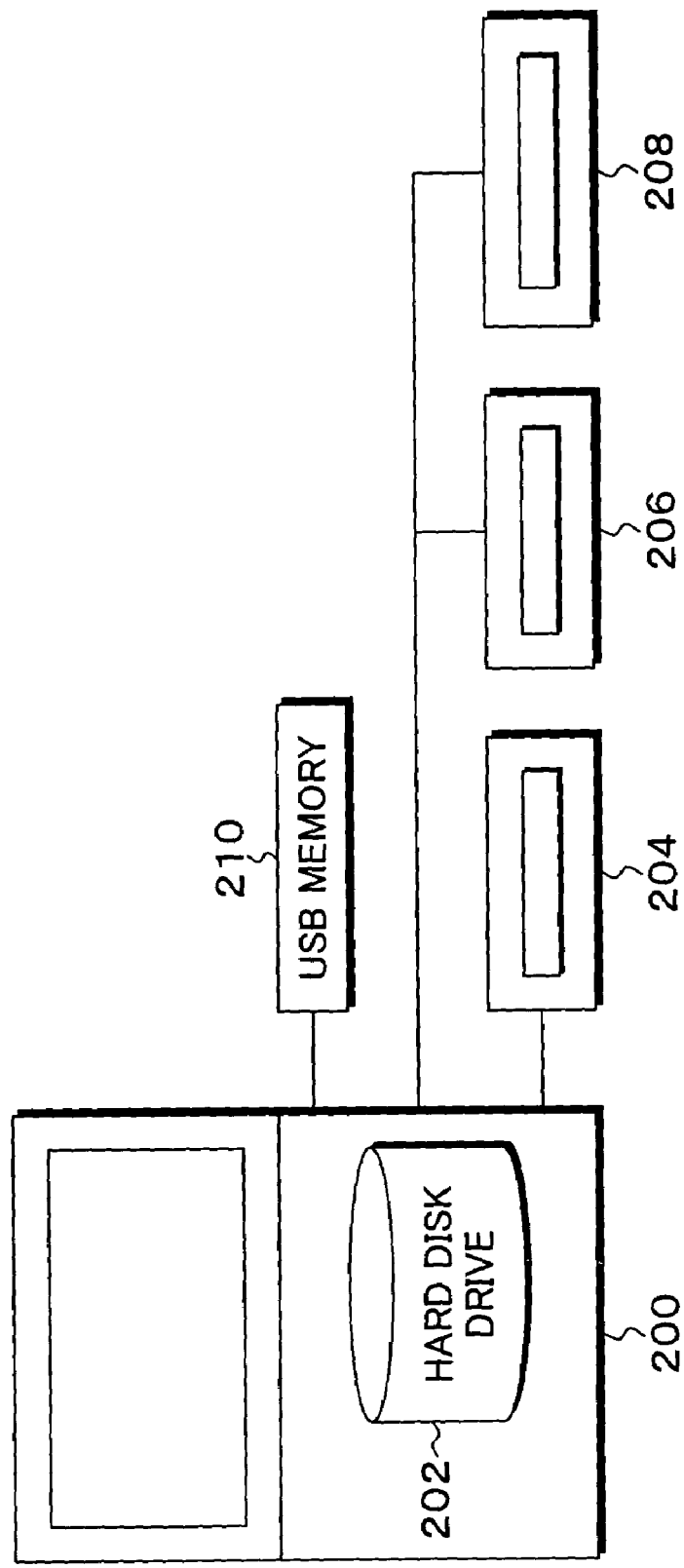
FIG. 1 is an explanatory diagram of a conventional microcomputer.
Figure 2:
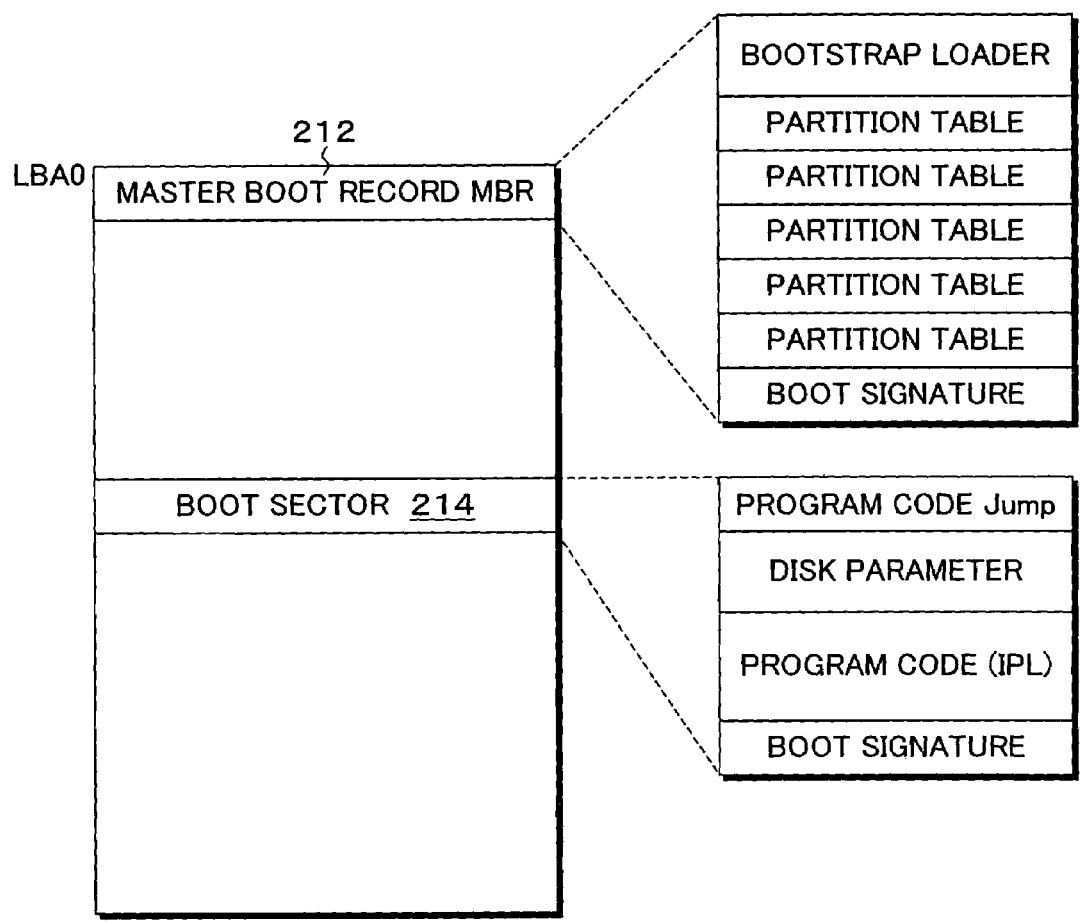
FIG. 2 is an explanatory diagram of a disk layout of a conventional hard disk drive for executing a boot process.
Figure 3:
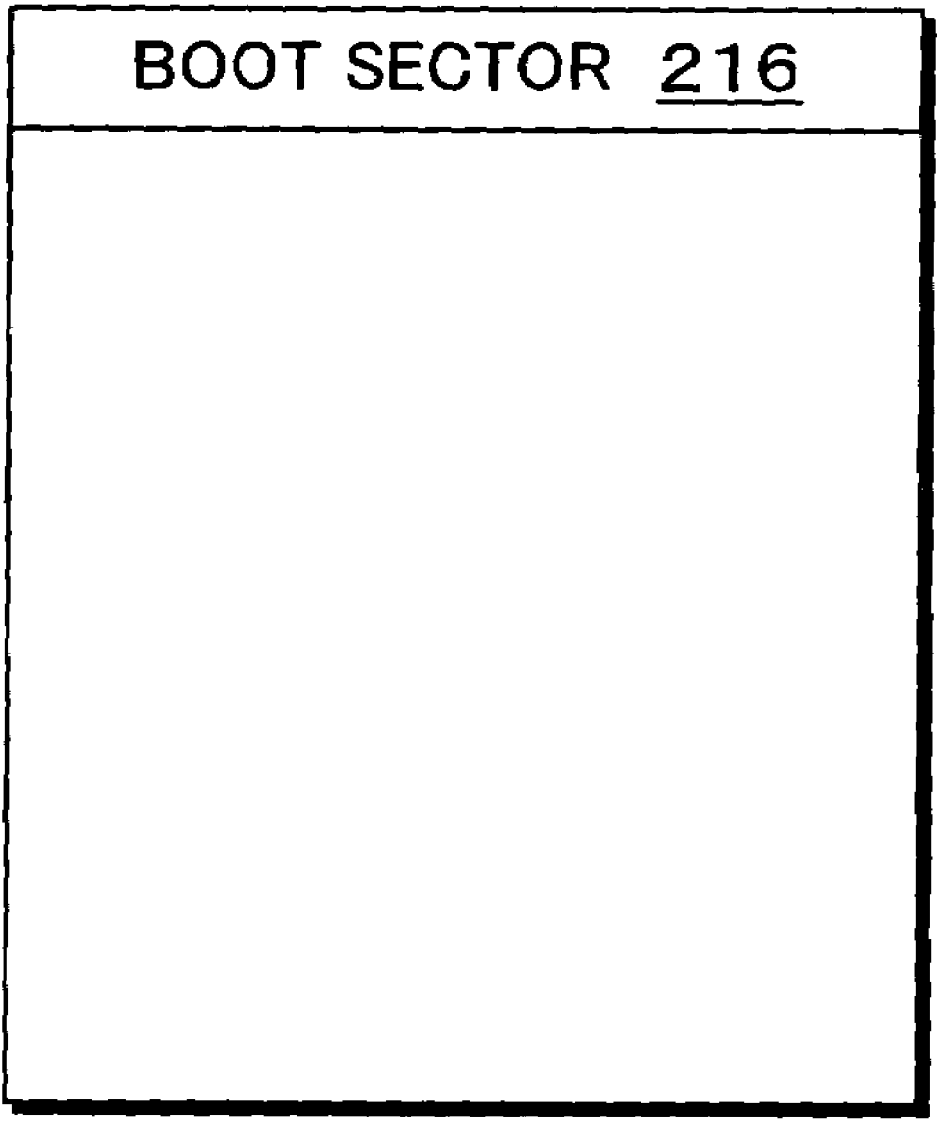
FIG. 3 is n explanatory diagram of a disk layout of a conventional floppy (R) drive for executing a boot process.
Figure 4:
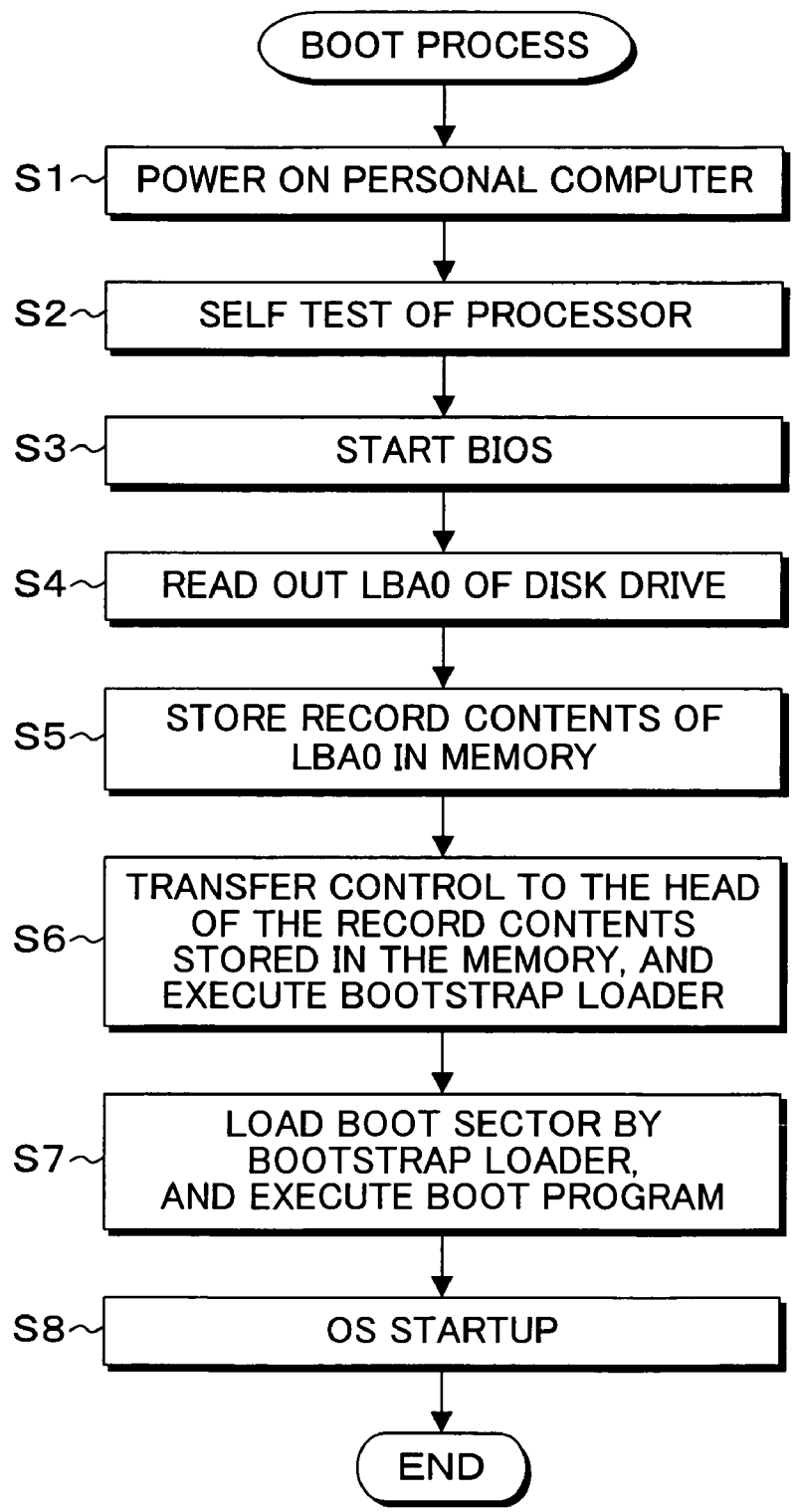
FIG. 4 is a flow chart of a conventional boot process.
Figure 5:
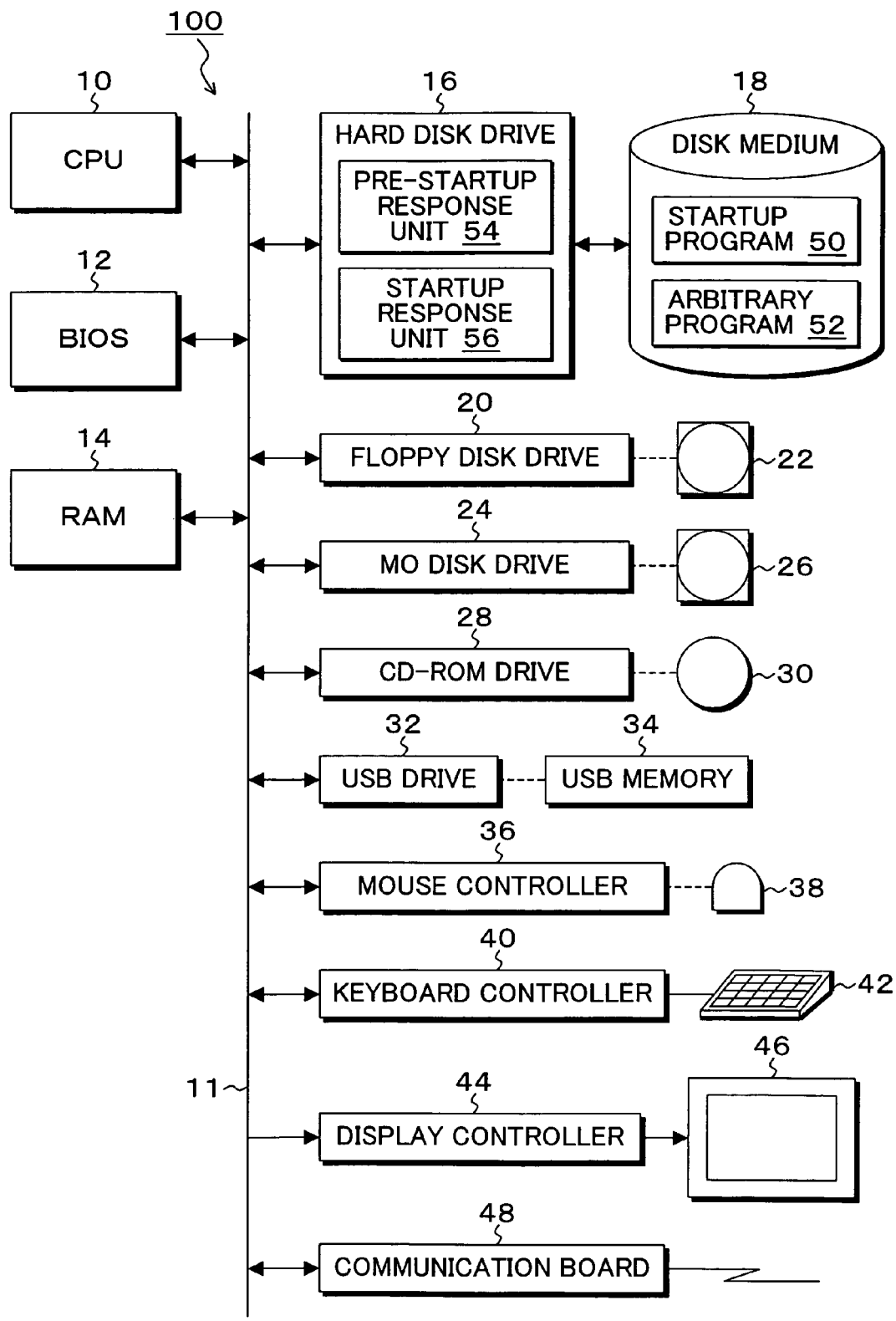
FIG. 5 is a block diagram of a personal computer to which a startup program execution process of the present invention is applied.

FIG. 5 is a block diagram of a personal computer to which a startup program execution process of the present invention is applied. In FIG. 5, with respect to a bus 11 of a CPU 10, a BIOS 12 for starting up an OS when the power is turned on is provided, and a RAM 14 which serves as a main storage is provided. A hard disk drive 16 is provided as an input/output device with respect to the CPU 10, and the hard disk drive 16 is provided with a disk storage medium 18. In this example, a case in which the hard disk drive 16 is used as a startup drive is referred to as an example. Furthermore, with respect to the bus 11 provided are a floppy (R) disk drive 20, an MO disk drive 24, a CD-ROM drive 28, and a USB drive 32 which use a floppy (R) disk 22, an MO cartridge storage medium 26, a CD-ROM storage medium 30, and a USB memory 34, respectively, as a storage medium. Moreover, with respect to the bus 11, a mouse 38 is connected via a mouse controller 36, a keyboard 42 is connected via a keyboard controller 40, a display 46 is connected via a display controller 44, and a network connection such as a LAN is established via a communication board 48. In the disk storage medium 18 of the hard disk drive which operates as a startup disk, a startup program 50 for starting up an OS and an arbitrary program 52 to be executed before startup of the OS are stored. As the arbitrary program 52, as is disclosed in later description, an arbitrary program that has to be executed before the stage of OS start-up of the computer, such as various types of security programs and virus check programs, can be stored. The functions of a pre-startup response unit 54 and a startup response unit 56 are provided in the hard disk drive 16. The pre-startup response unit 54 responds to a first read request from the BIOS 12 after the power of the personal computer 100 is turned on by reading out, instead of a startup sector storing the startup program 50 which is stored in the disk storage medium 18 and specified by ahead logical block address LBA0, a provisional startup sector storing an arbitrary program, stores it in the RAM 14, and transfers control to the contents thereof so as to execute the arbitrary program by the CPU 10. The startup response unit 56 responds to a read request of a subsequent startup sector which is according to execution of the arbitrary program by the CPU 10 by reading out the startup sector at LBA0 storing the startup program 50 of the disk storage medium 18, stores it in the RAM 14, and transfers control to the head thereof so as to execute the startup program 50, load an OS from the disk storage medium 18, and startup the OS. Herein, although the head sector at LBA0 is referred to as an example of the startup sector storing the startup program 50, other than the head sector, for example, that at LBA1 may be used as the startup sector in some cases depending on the BIOS, and the startup sector is not always limited to the head sector at LBA0.

Figure 6:
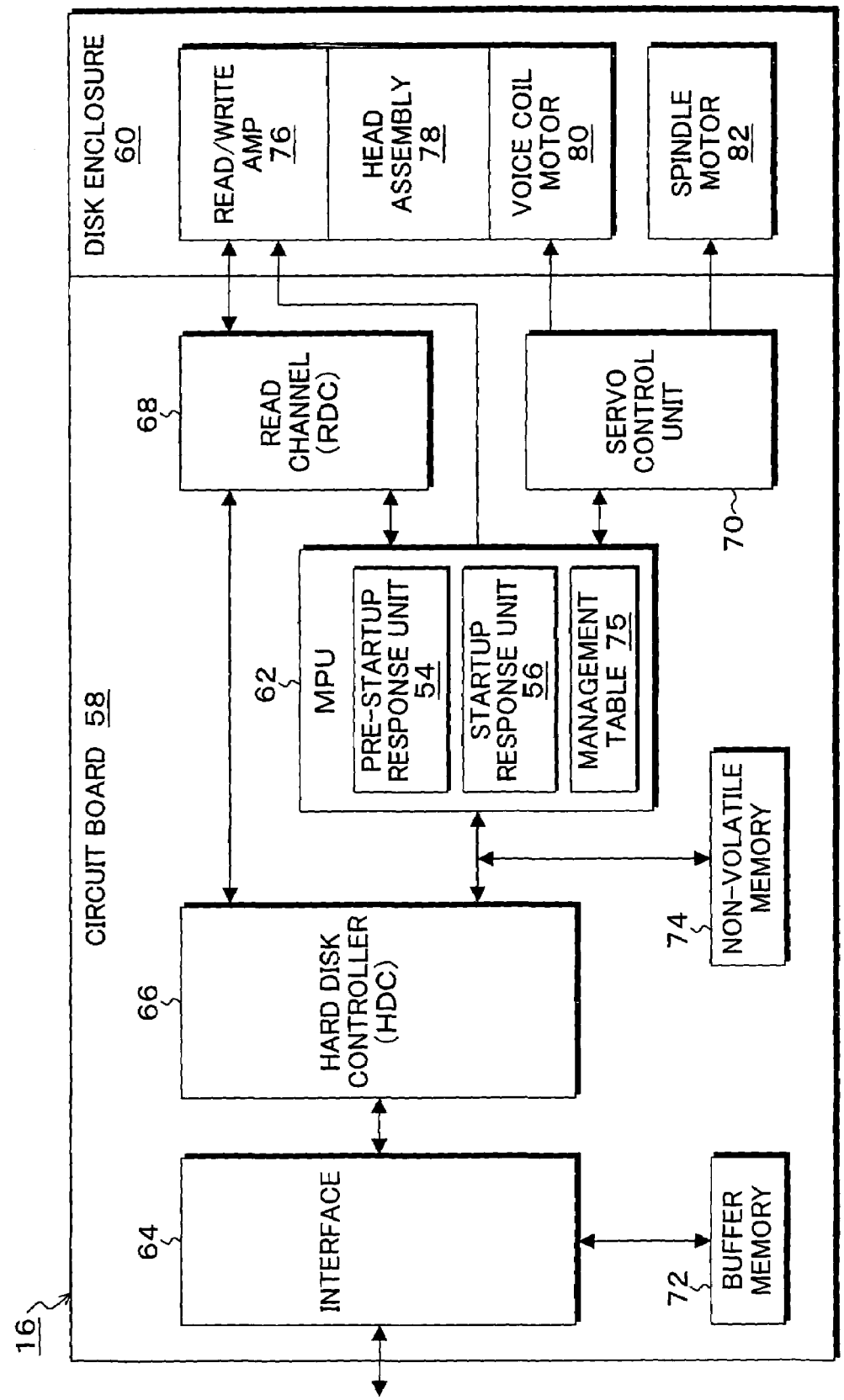
FIG. 6 is a block diagram of the hard disk drive of FIG. 5.

FIG. 6 is a block diagram of a hard disk drive used as a startup drive in FIG. 5. In FIG. 6, the hard disk drive 16 is composed of a circuit board 58 and a disk enclosure 60. In the circuit board 58, a MPU 62, an interface 64, a hard disk controller 66, a read channel 68, a servo control unit 70, a buffer memory 72, and a non-volatile memory 74 are provided. In the disk enclosure 60, a read/write amp 76, a head assembly 78, a voice coil motor 80, and a spindle motor 82 are provided. An unillustrated disk storage medium is attached to the rotating shaft of the spindle motor 82, and rotated at a constant rate. The head assembly 78 is supported at the distal end of the arm of a head actuator, and when the head actuator is driven by the voice coil motor 80, positioning of a composite head of the head assembly 78 having a read head and a write head is carried out with respect to the storage medium surface of the magnetic disk storage medium. In the MPU 62, in order to execute arbitrary programs before OS start-up, the pre-startup response unit 54, the startup response unit 56, and a management table 75 for managing the information required when a plurality of arbitrary programs are to be executed at the pre-startup response unit 54 are provided.

Figure 7:
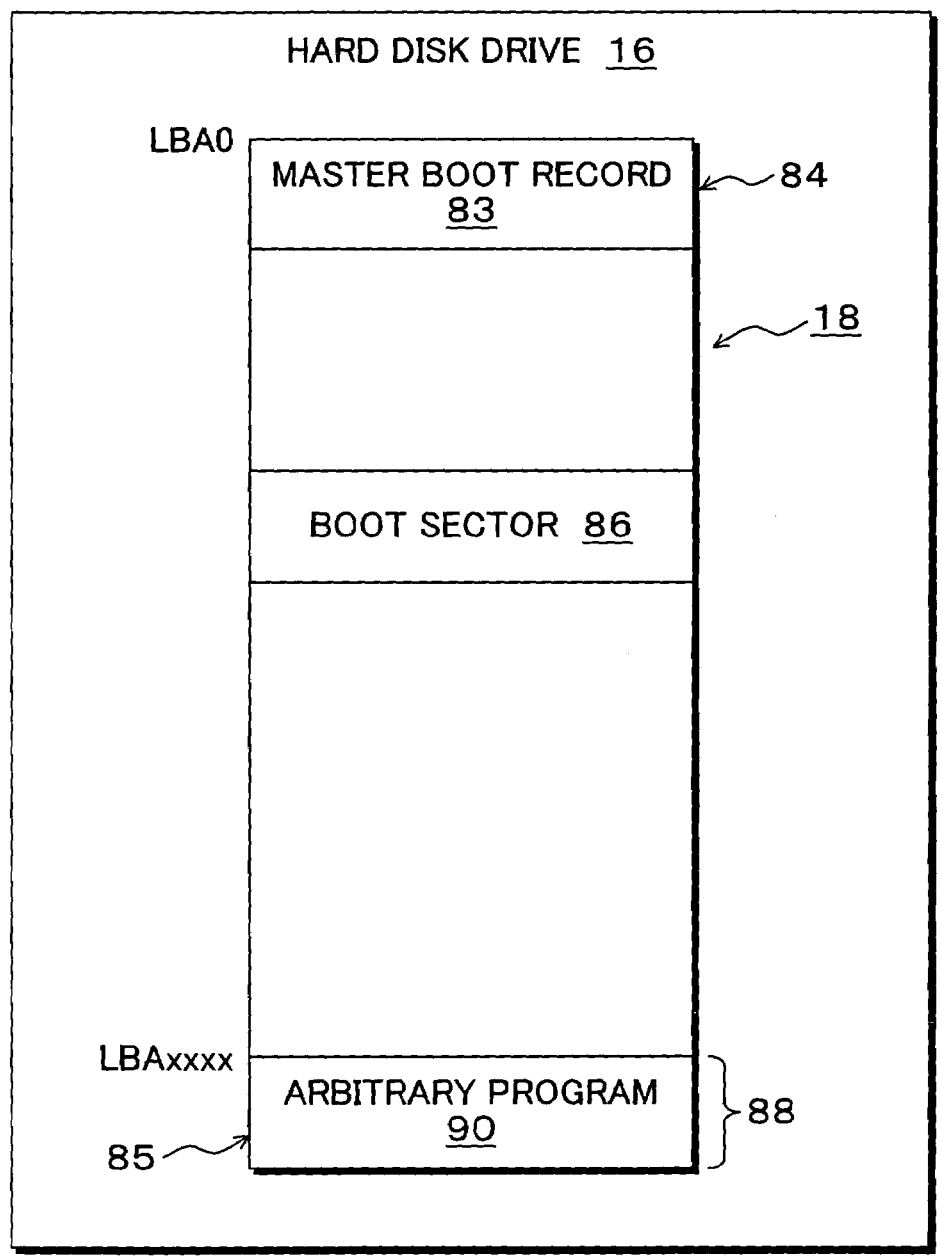
FIG. 7 is an explanatory diagram of a disk layout of a provisional startup disk storing an arbitrary program to be executed before OS start-up.

FIG. 7 is an explanatory diagram of a disk layout in which an arbitrary program to be executed before OS start-up is stored. In FIG. 7, a master boot record 83 is recorded as a startup program in a startup sector 84 specified by the logical block address LBA0 in the disk storage medium 18 of the hard disk drive 16, and a boot sector 86 is recorded in an arbitrary partition of the startup sector. With respect to such startup program composed of the master boot record 84 and the boot sector 86, in the present invention, an OS-inaccessible sector 88 that cannot be accessed by an OS is provided as a provisional startup sector 85 at a logical block address LBAxxxx, and an arbitrary program 90 to be executed before OS start-up is stored in the provisional startup sector 85.

Figure 8B:
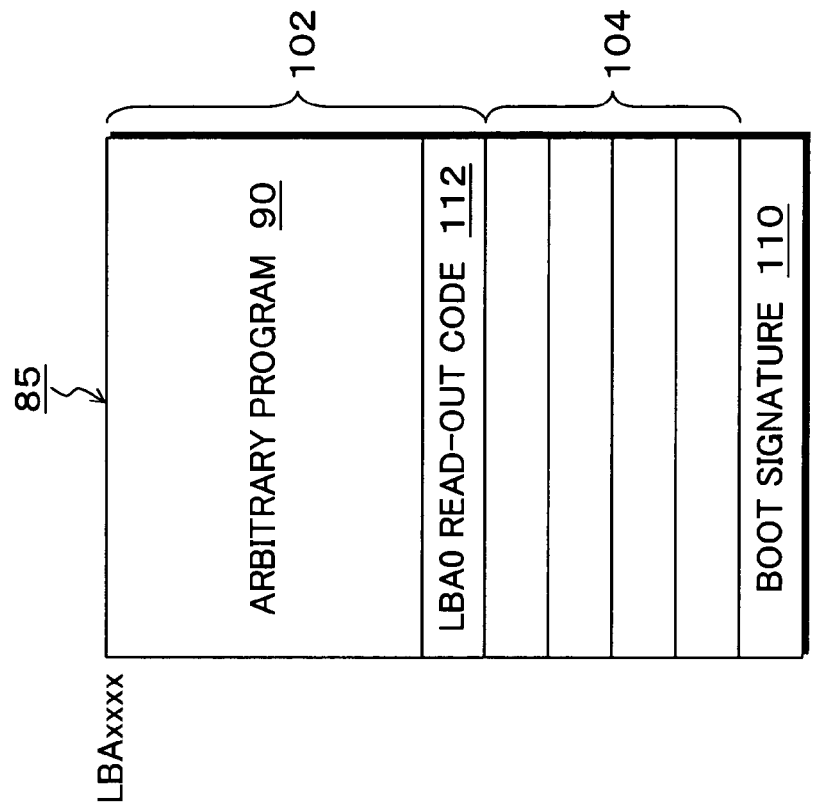
FIGS. 8A and 8B are explanatory diagrams showing the contents of the provisional startup sector of FIG. 5 recording an arbitrary program in comparison with the startup sector.
Figure 8A:
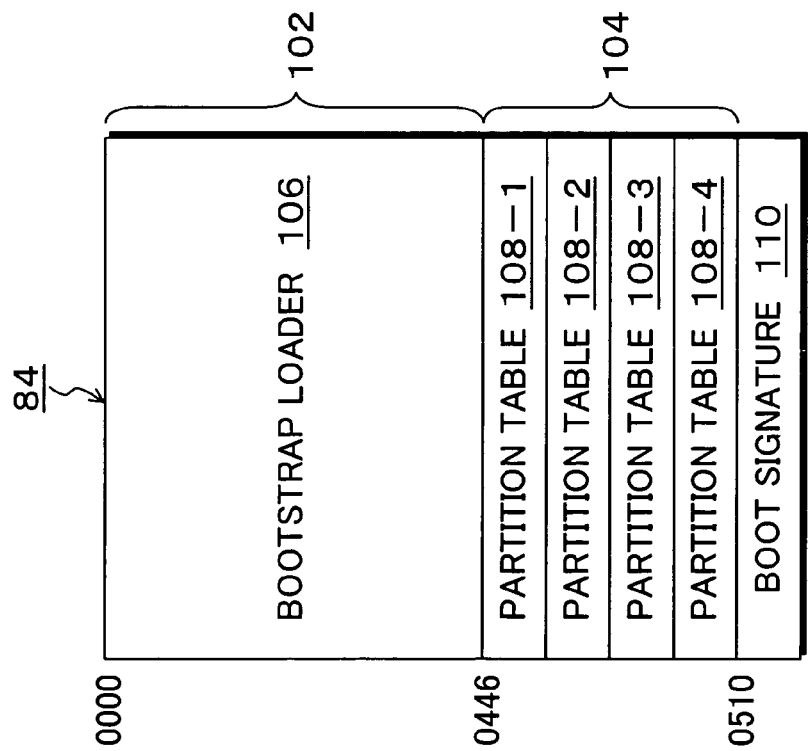

FIGS. 8A and 8B are explanatory diagrams showing the contents of the provisional startup sector of FIG. 7 for recording an arbitrary program, in comparison with the startup sector storing a startup program.

FIG. 8A is the startup sector 84 storing a startup program, which is to be loaded into the RAM 14 in response to the readout performed by the BIOS 12 when the personal computer 100 is started up. The startup sector 84 is divided into a 446-byte program area 102 and a 64-byte partition area 104, wherein a bootstrap loader 106 is stored in the program area 102, and the partition area 104 is divided into four areas and stores partition tables 108-1 to 108-4. In the area of the last 4 bytes, boot signature 110 is stored. The size of the startup sector 84 is 512 bytes in a case of a PC-AT compatible machine. In start-up of an OS by use of the startup sector 84, the BIOS 12 reads out the startup sector 84 at LBA0 in the hard disk drive 16 serving as the startup drive, thereby loading the master boot record 83 into the RAM 14. When the master boot record 83 is loaded into the RAM 14, control is transferred to the bootstrap loader 106 of FIG. 8A. The boot strap loader 106 executes a startup program in, for example, the following procedure.
(1) Check the partition tables 108-1 to 108-4, so as to search the partition area in which a startup flag is on.
(2) When the partition area in which a startup flag is on is found, obtain the address of the startup sector in the partition area from the table.
(3) Present the partition head address to the BIOS 12, so as to cause it to load the partition startup sector, i.e., the boot sector 86.
(4) Transfer control to the loaded partition startup sector, i.e., the boot sector.

The boot signature 110 at the end of the startup sector 84 has a value "0xAA55" called a magic number, and, by virtue of having the magic number, the startup process is carried out while assuming the master boot record 84 as an effective one.

FIG. 8B shows the contents of the provisional startup sector 85 storing the arbitrary program 90 to be executed before OS start-up in the present invention. The provisional startup sector 85 has a size of 514 bytes which is same as that of the startup sector 84 storing a startup program, also has the format structure of the interior of the sector which is same as that of the startup sector 84, and records a 446-byte program area 102, a 64-byte partition area 104, and, by use of the last 4 bytes, a boot signature 110. With respect to such provisional startup sector 85, the arbitrary program 90 to be executed before OS start-up is stored in the 446-byte program area 102. The arbitrary program 90 stored in the program area 102 stores a LBA0 readout code 112 at the end of the program. Therefore, when the arbitrary program 90 is executed, the LBA0 readout code 112 is executed at the end, and, as a result, readout of the startup sector specifying LBA0 is requested to the hard disk drive 16. In regard to the partition area 104, if a first readout request from the BIOS 12 after power is turned on is not for executing the bootstrap loader 106, but a request for reading out the partition area 104, the partition tables 108-1 to 108-4 of the partition area 104 in the startup sector 84 is copied to the partition area 104, so as to return the provisional startup sector 85. As a matter of course, if a first readout request from the BIOS 12 is that for executing the bootstrap loader 106, there is no need to copy and return the partition tables 108-1 to 108-4. In this case, the partition area 104 can be also used as the program area 102 for storing the arbitrary program 90. As described above, in the present invention, the provisional startup sector 85 having a sector length of 514 bytes which is same as that of the startup sector 84 specified by LBA0 as shown in FIG. 7 is provided in a particular area which cannot be normally accessed in the hard disk drive 16, for example, in the OS-inaccessible area 88 which cannot be accessed by an OS, and the arbitrary program 90 is stored therein as shown in FIG. 8B; therefore, when a response to a first request after the power is turned on from the BIOS 12 for reading out the startup sector of the startup disk is carried out by reading out, instead of the startup sector 84, for example, the provisional startup sector 85 prepared in the OS-inaccessible area 88 so as to load it into the RAM 14, and control is transferred to the head of the arbitrary program 90, which is the contents thereof, the arbitrary program 90 can be executed before execution of the bootstrap loader 106 serving as the startup program of the OS. When the arbitrary program 90 is executed, since the LBA0 readout code 112 is stored at the end of the arbitrary program 90 as shown in FIG. 8B, according to execution of the LBA0 readout code 112, a second readout with respect to the startup sector 84 at LBA0 is requested to the hard disk drive 16. In response to the second readout request, the actual startup sector 84 is loaded into the RAM 14, and control is transferred to the head of the read contents, i.e., the bootstrap loader 106 of the startup sector 84 shown in FIG. 8A. Accordingly, the startup process is executed, wherein the boot sector 86 is loaded from the partition startup sector of the partition in which a startup flag is on, and, according to execution of the program code of the initial program load stored in the contents of the boot sector 86, file systems are sequentially loaded from the hard disk drive, thereby starting up the OS.

Figure 9:
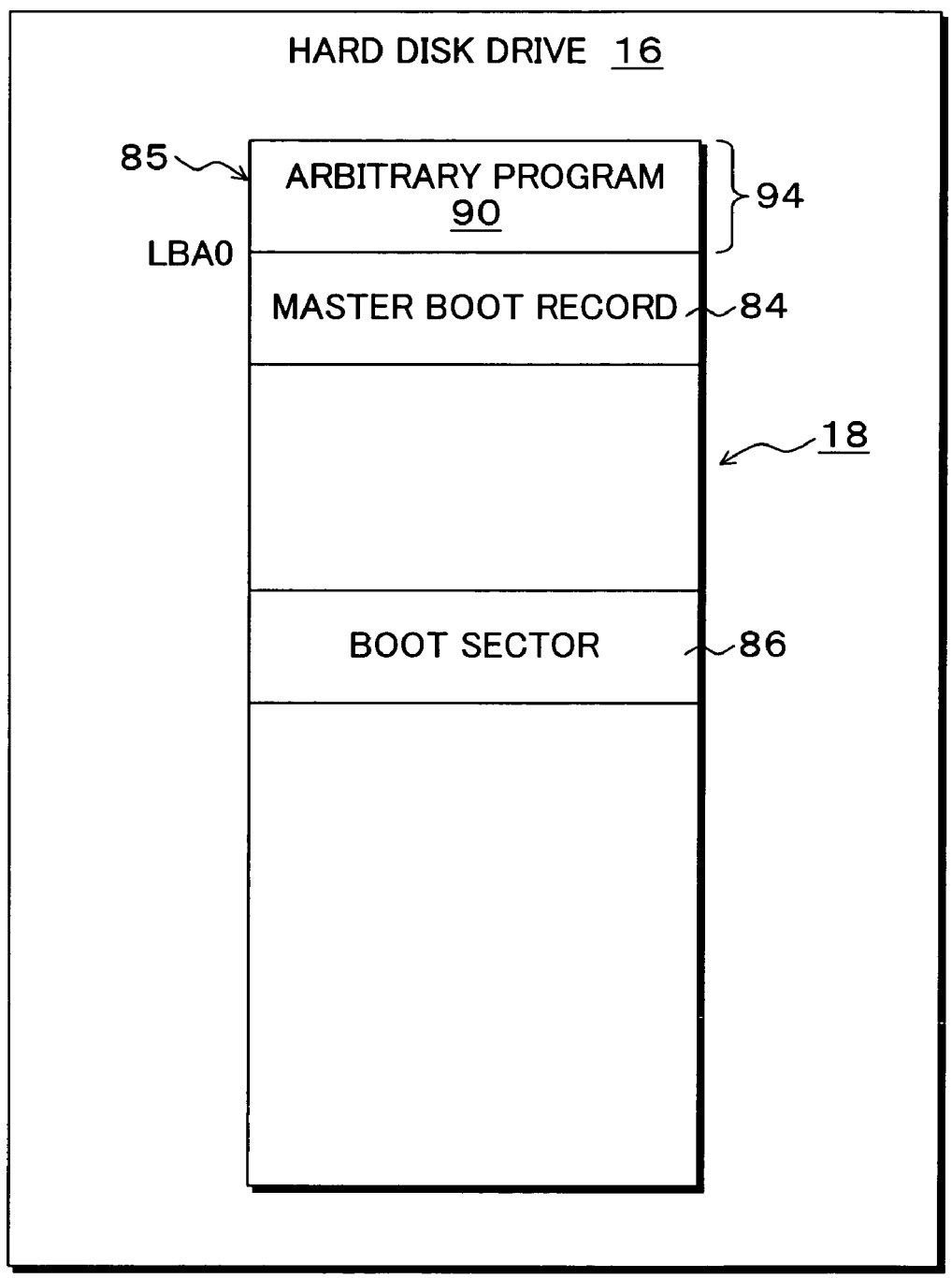
FIG. 9 is an explanatory diagram of another disk layout of a provisional startup sector storing an arbitrary program to be executed before OS start-up.

FIG. 9 is an explanatory diagram of another disk layout of the provisional startup sector storing an arbitrary program to be executed before OS start-up. In FIG. 9, the provisional startup sector 85 is disposed in the normally inaccessible sector of the disk storage medium 18 in the hard disk drive 16, that is, a system area 94 that can be accessed only by the drive, so as to store the arbitrary program 90.

Figure 10:
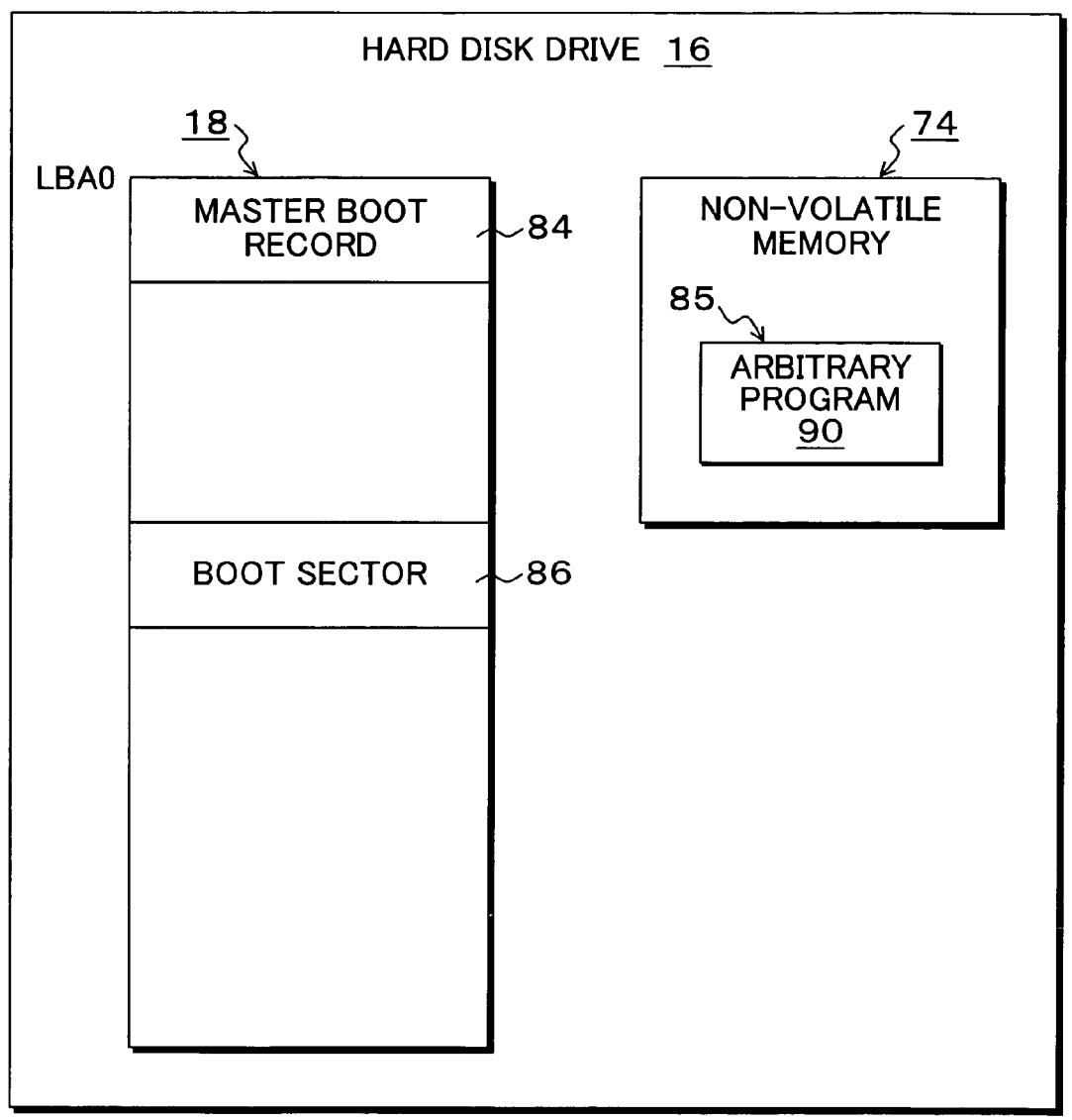
FIG. 10 is an explanatory diagram of a hard disk drive in which a provisional startup sector storing an arbitrary program to be executed before OS start-up is disposed in a non-volatile memory.

FIG. 10 is an explanatory diagram of a hard disk drive in which the provisional startup sector of the arbitrary program to be executed before OS start-up is stored in a non-volatile memory. In FIG. 10, since the non-volatile memory 74 is provided in the hard disk drive 16, in this embodiment, the provisional startup sector 85 is disposed in the area of the non-volatile memory 74, and the arbitrary program 90 is stored therein. In regard to the arbitrary program 90 of both FIG. 9 and FIG. 10, the format of the provisional startup sector 85 serving as the storage area thereof is same as that shown in FIG. 8B.

Figure 11A:
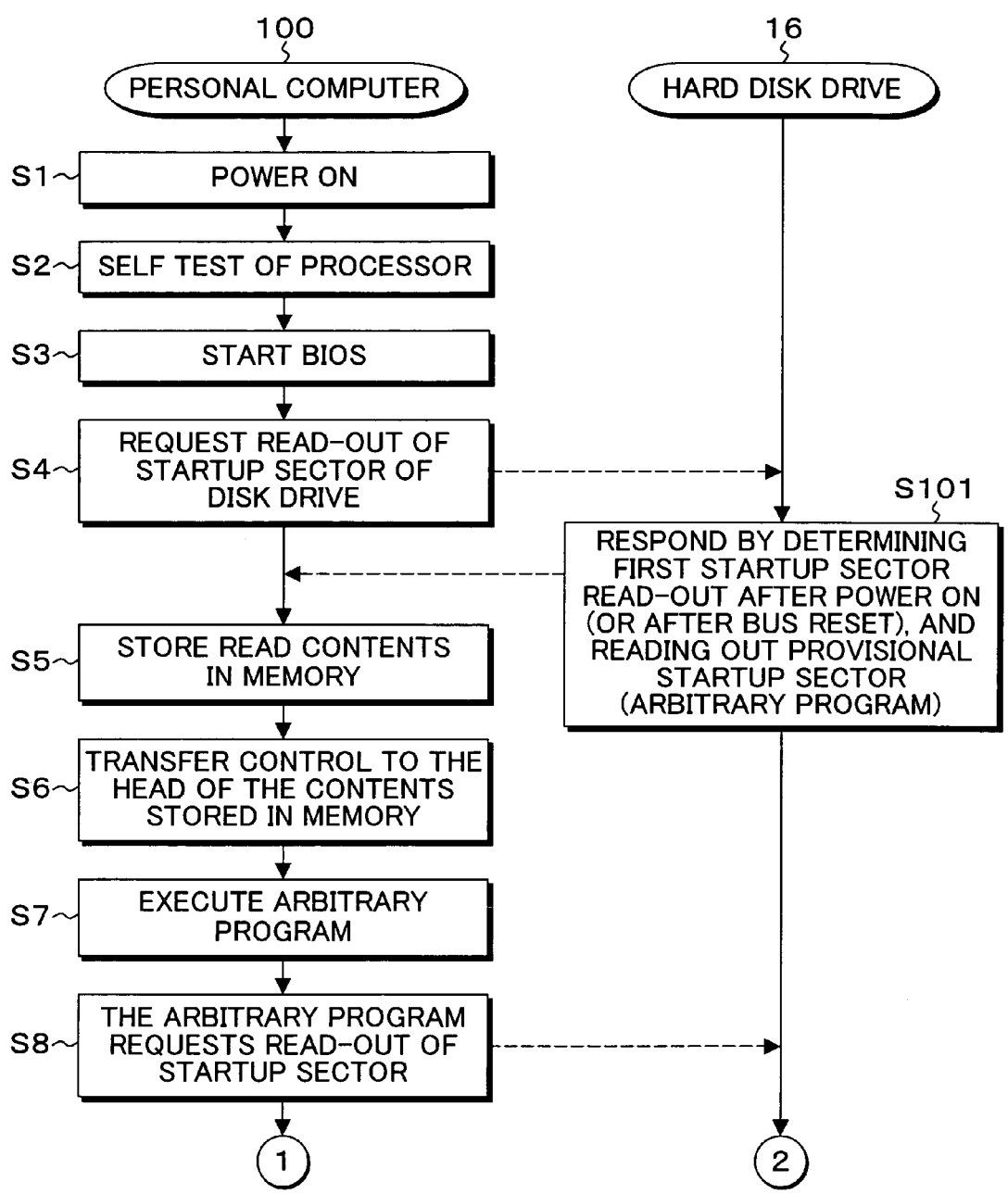
FIGS. 11A and 11B are time charts of a control process according to the present invention for executing an arbitrary program before OS start-up.
Figure 11B:
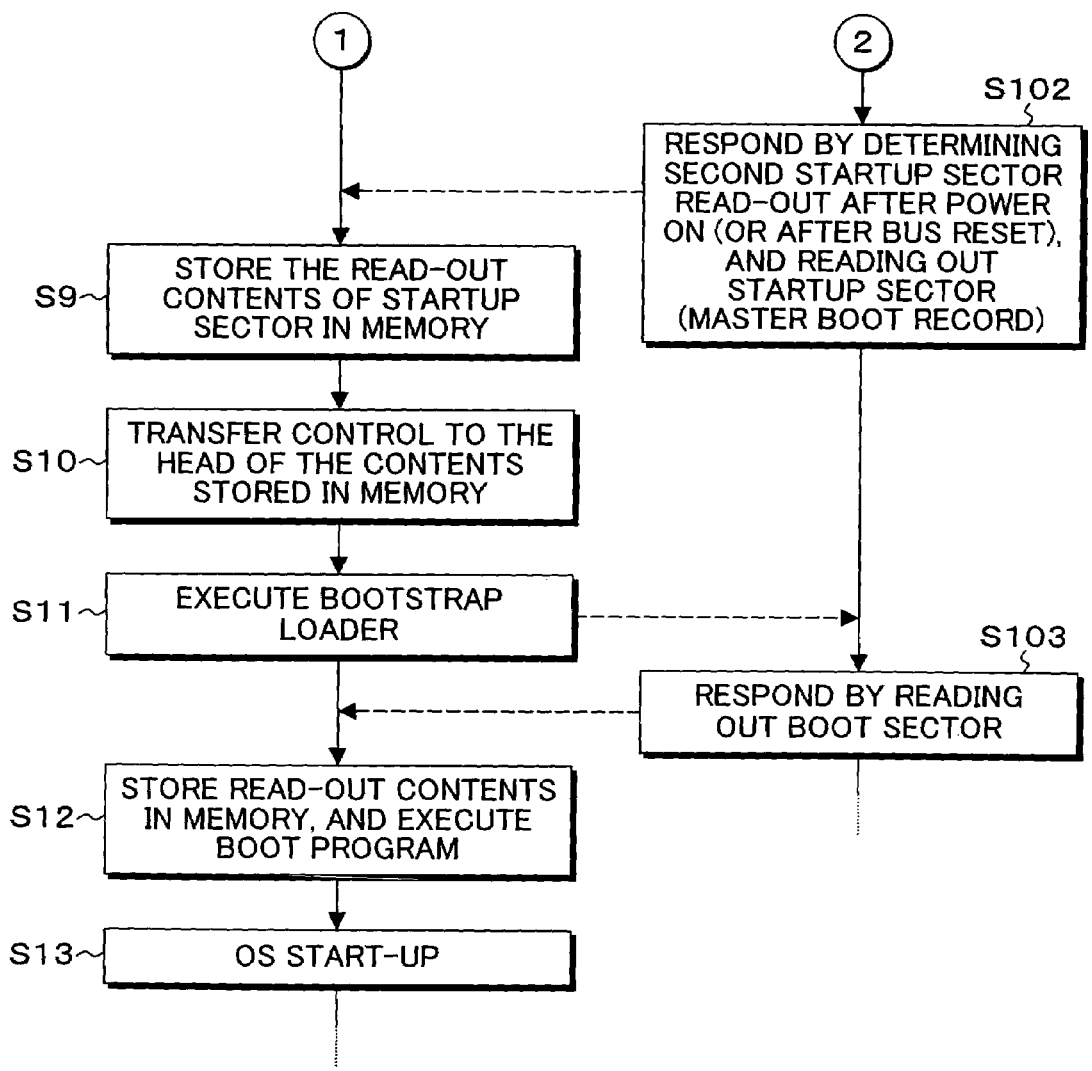

FIGS. 11A and 11B are time charts of a control process according to the present invention for executing an arbitrary program before OS start-up, wherein the processes of the personal computer 100 serving as an upper-level system and the hard disk drive 16 which is a startup drive are shown. In FIGS. 11A and 11B, when the power of the personal computer 100 is turned on in a step S1, self test of the processor is performed in a step S2, and then, the BIOS 12 is started in a step S3. The started BIOS 12 first searches the startup drive. It depends on the setup of the boot sequence of the BIOS 12, and the default is normally "A then C", that is, the floppy (R) is the first and then the hard disk. In this case, since no floppy (R) is inserted, the hard disk is found as the startup drive. When the startup drive is determined, in a step S4, readout of the startup sector specifying LBA0 of the hard disk drive 16 is requested. In response to the readout request, in a step S101, the hard disk drive 16 determines a first startup sector readout which is after the power is turned on, and in this case, for example, as shown in FIG. 7, responds by reading out the provisional startup sector 85 storing the arbitrary program 90 in the OS-inaccessible sector 88. The personal computer 100 stores the readout contents in a memory composed of a RAM in a step S5, and then transfers control to the head of the contents stored in the memory, i.e., the head of the arbitrary program 90 in a step S6. Then, the arbitrary program 90 is executed in a step S7. When execution of the arbitrary program 90 is finished, as shown in FIG. 8B, the LBA0 readout code 112 provided at the end of the arbitrary program 90 is executed, such that the arbitrary program issues a request for reading out the startup sector 84 at LBA0 in a step S8. In response to this, the hard disk drive 16 determines a second LBA readout after the power is turned on, i.e., startup sector readout, and responds by reading out the startup sector 84 in a step S102. The personal computer 100 stores the master boot record 84, which is the readout contents of the startup sector 84 at LBA0, in the memory in a step S9, and then transfers control to the head of the contents stored in the memory, i.e., the head of the bootstrap loader 106 shown in FIG. 8A in a step S10. Accordingly, the bootstrap loader 106 is executed in a step S11, thereby requesting the hard disk drive 16 to read out the partition startup sector in which a startup flag is on. The hard disk drive 16 responds by reading out the boot sector 86 from the partition startup sector in which a startup flag is on in a step S103. The personal computer 100 stores the readout contents in the memory and executes the boot program in a step S12. As a result, file systems are sequentially loaded, and the OS is started up in a step S13.

Figure 12:
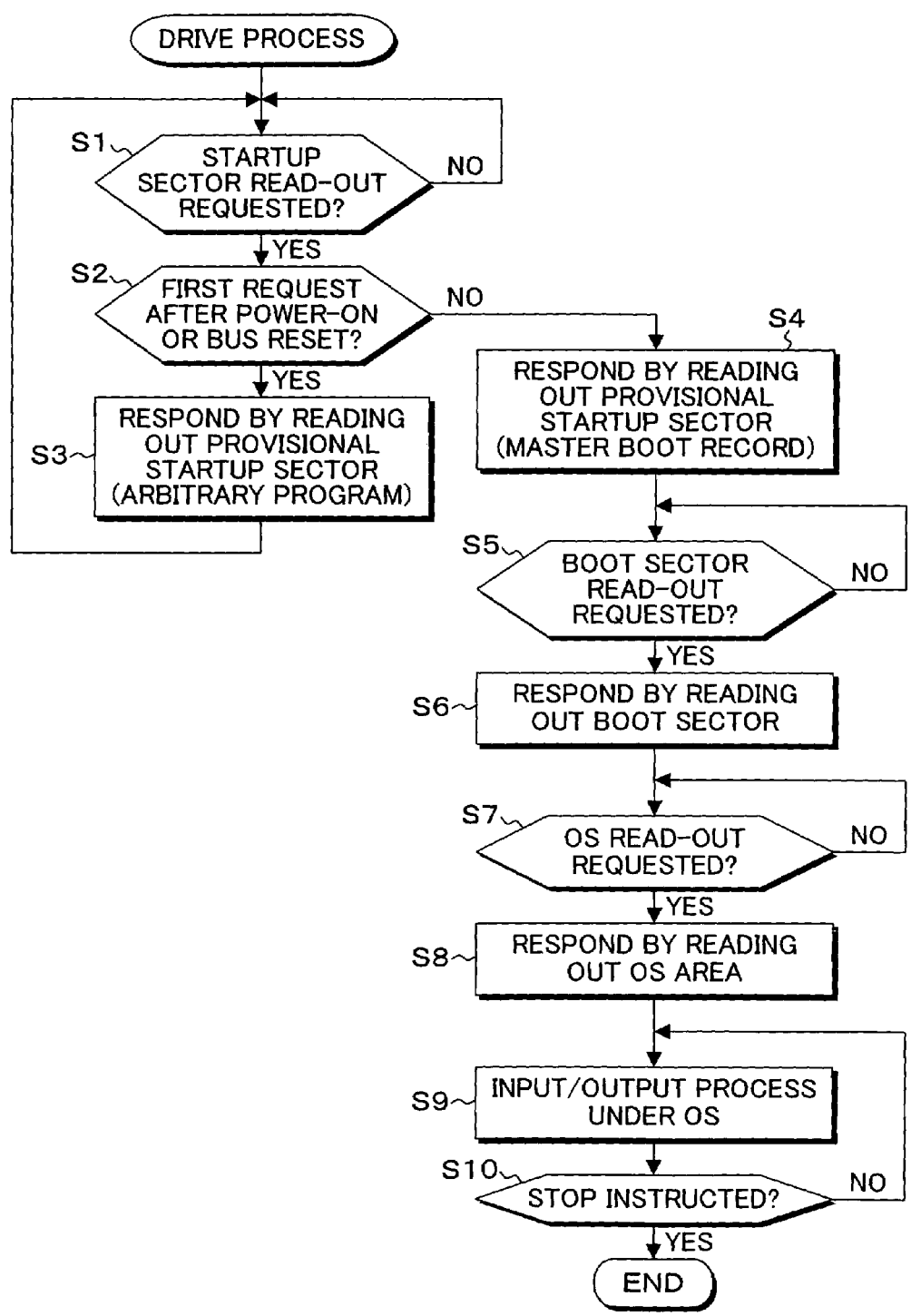
FIG. 12 is a flow chart of a drive process corresponding to the control process of FIGS. 11A and 11B.

FIG. 12 is a flow chart of the drive process of the hard disk drive 16 corresponding to the control process of FIGS. 11A and 11B. In FIG. 12, the hard disk drive 16 checks the readout request of the startup sector specifying LBA0 in a step S1, if there is the readout request of the startup sector, checks whether or not it is a first request after the power is turned on or bus reset in a step S2, and if it is the first request, responds by reading out the provisional startup sector storing the arbitrary program in a step S3. If there is a second readout request of the startup sector, it is determined to be that of a second time or later in a step S2 so as to proceed to a step S4, wherein a response is made by reading out the startup sector which is the master boot record. In this state, if boot-sector readout request is determined in a step S5, a response is made by reading out the boot sector in a step S6. Subsequently, if there is an OS readout request, i.e., a file readout request in a step S7, a response is made by reading out the requested OS area in a step S8, thereby starting up the OS. After the start-up, input/output processes are performed under the OS in a step S9. That is, responses of writing data to the disk storage medium according to write commands and reading out data from the disk storage medium according to read commands are carried out. Such process is repeated until stop is instructed in a step S10.

Figure 13:
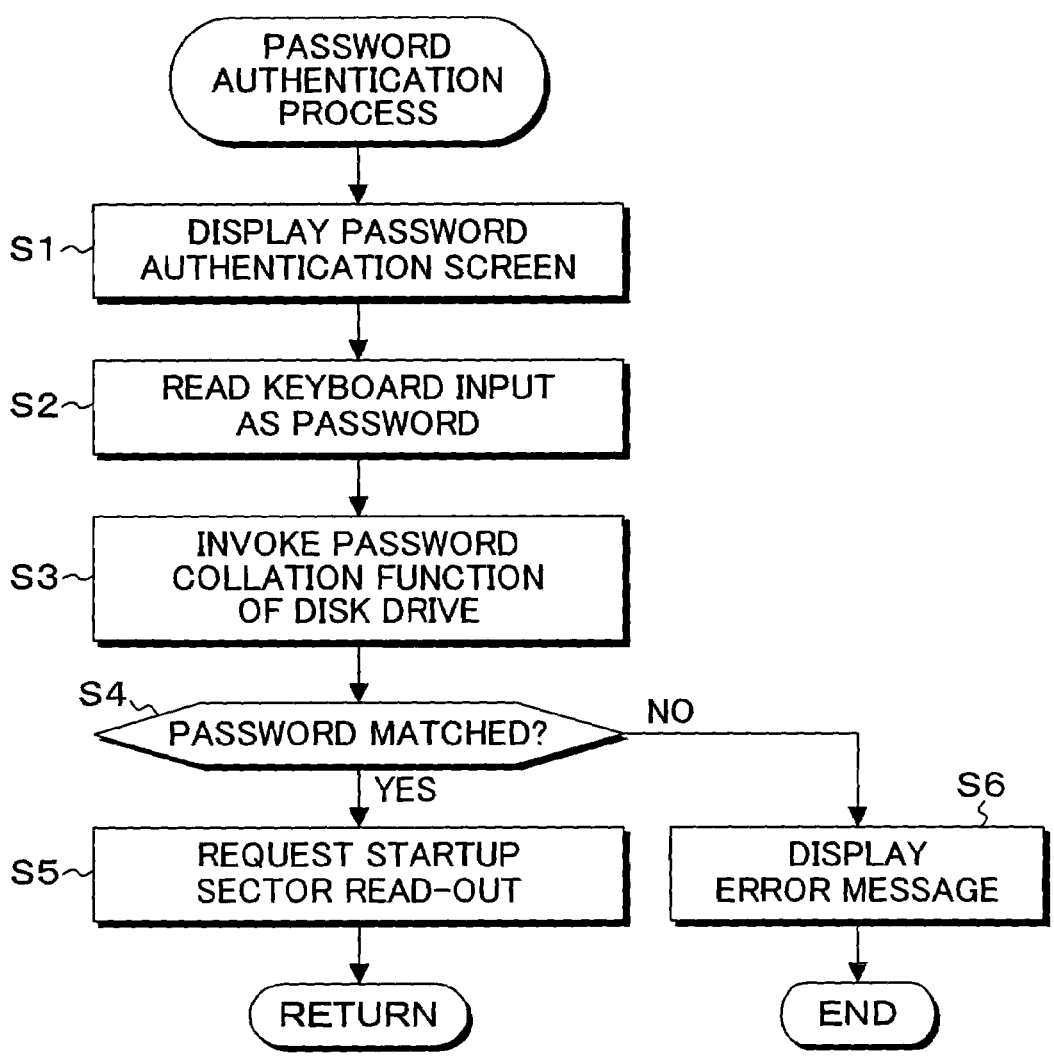
FIG. 13 is a flow chart of a password authentication process to be executed before OS start-up.

FIG. 13 is a flow chart of the case in which an encryption generation processing program is executed as the arbitrary program of the present invention which is executed before OS start-up. In FIG. 13, in a password authentication process, a password authentication screen is displayed in a step S1, in this state, keyboard input is read as a password in a step S2, a password collation function of the hard disk drive is invoked in a step S3, an already registered password and the input password are collated so as to determine whether or not the passwords match in a step S4, and if the passwords match, the password authentication process is terminated in a step S5, and readout of the startup sector at LBA0 is requested so as to make a transition to the process of after OS start-up. On the other hand, if the passwords did not match in the step S4, an error message is displayed in a step S6 and the process is terminated. In this case, since readout of the startup sector at LBA0 is not requested, the personal computer per se can be locked without starting up the OS.

Figure 14:
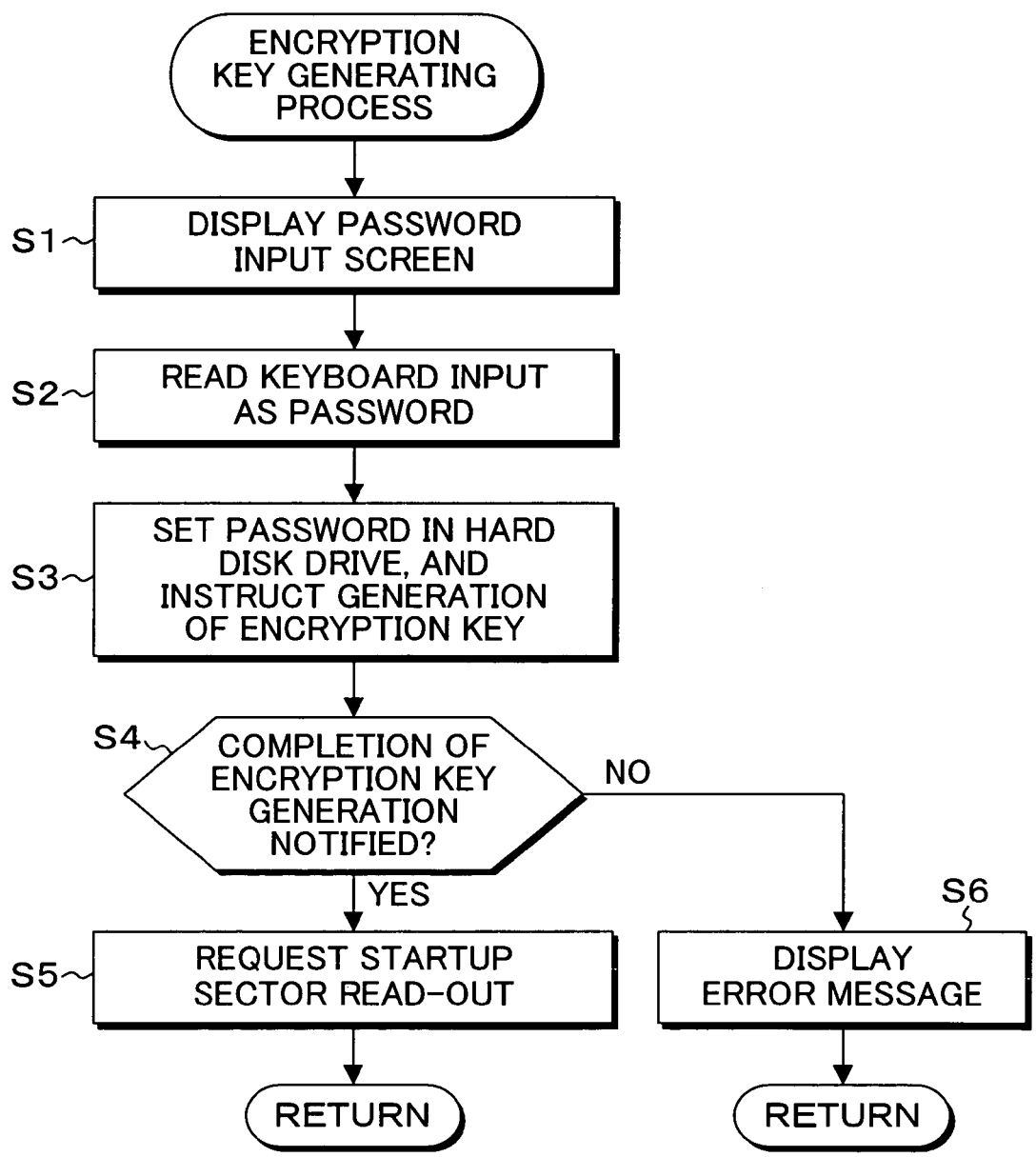
FIG. 14 is a flow chart of an encryption key generating process to be executed before OS start-up.

FIG. 14 is a flow chart of an encryption key generation processing program executed before OS start-up. In FIG. 14, in the encryption key generating process, a password input screen is displayed in a step S1, keyboard input is read as a password in a step S2, and the password is set in the hard disk drive so as to instruct generation of an encryption key in a step S3. If there is an encryption key generation completion notice in a step S4, readout of the startup sector specified by LBA0 is requested in a step S5, and then a transition to the process of after OS start-up is made. If there is no encryption key generation completion notice in the step S4, an error message is displayed in a step S6, and, since the OS is not started up in this case, the computer per se is locked. It should be noted that in the encryption key generation process, the processes of the step S4 and the step S6 may not be performed such that, merely, a password is set in the hard disk drive and an encryption key is generated. In this case, if the password is wrong, the right encryption key is not generated. Therefore, with the wrong encryption key, encryption of data cannot be decrypted with respect to the hard disk drive, and as a result, access to the disk contents cannot be performed, so as to lock.

Figure 15:
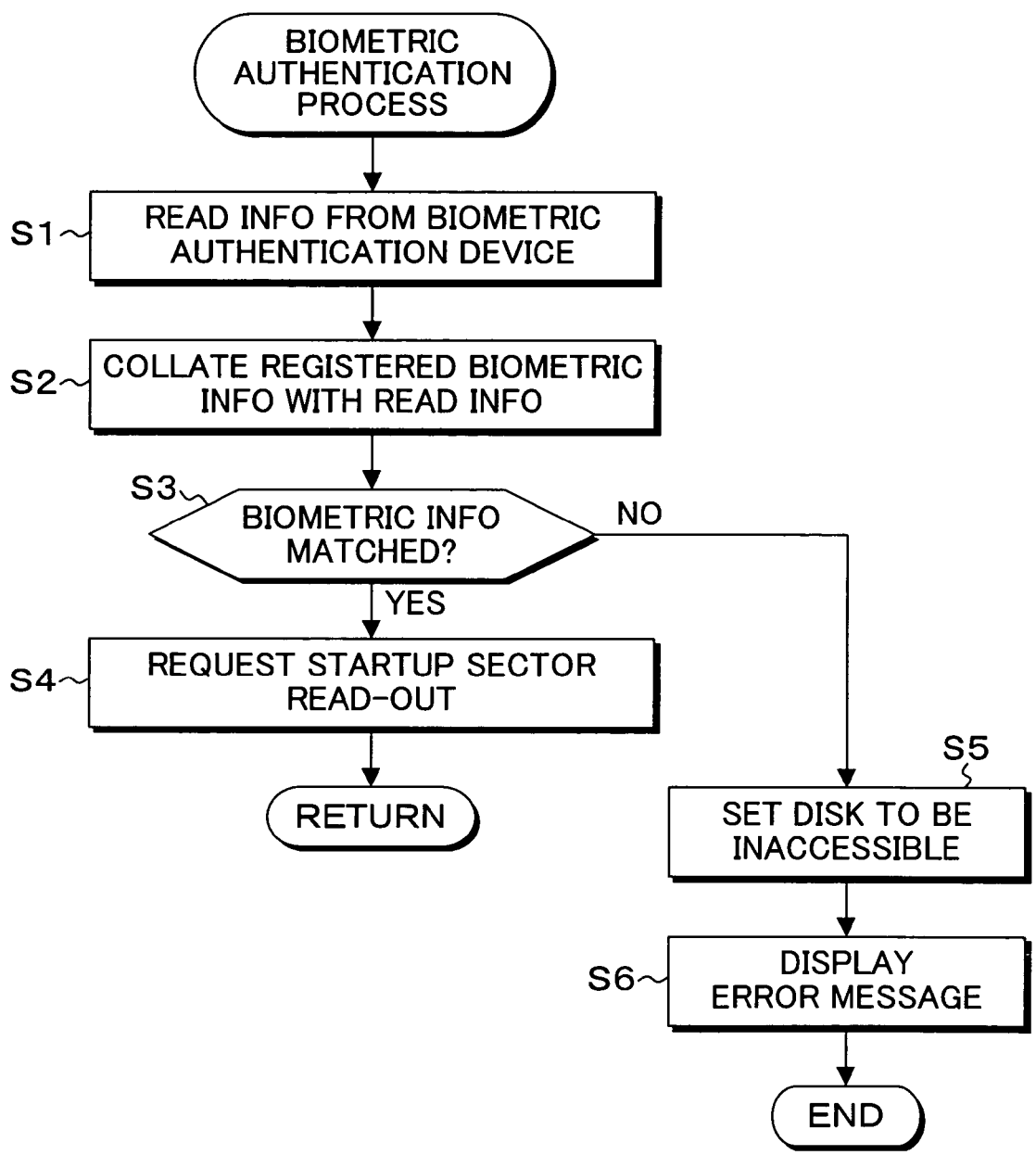
FIG. 15 is a flow chart of a biometric authentication process to be executed before OS start-up.

FIG. 15 is a flow chart of a biometric authentication processing program executed before OS start-up. In the biometric authentication process of FIG. 15, for example, the personal computer is provided with a fingerprint scanning device, a vein scanning device, or the like. Therefore, after information is read from a biometric authentication device in a step S1, registered biometric information and the read information are collated in a step S2, and if the biometric information matches in a step S3, readout of the startup sector specified by LBA0 is requested in a step S4 thereby starting up the OS. On the other hand, if the biometric information did not match in the step S3, after the hard disk drive is set to be inaccessible in a step S5, an error message is displayed in a step S6, and the computer is locked without starting up the OS.

Figure 16:
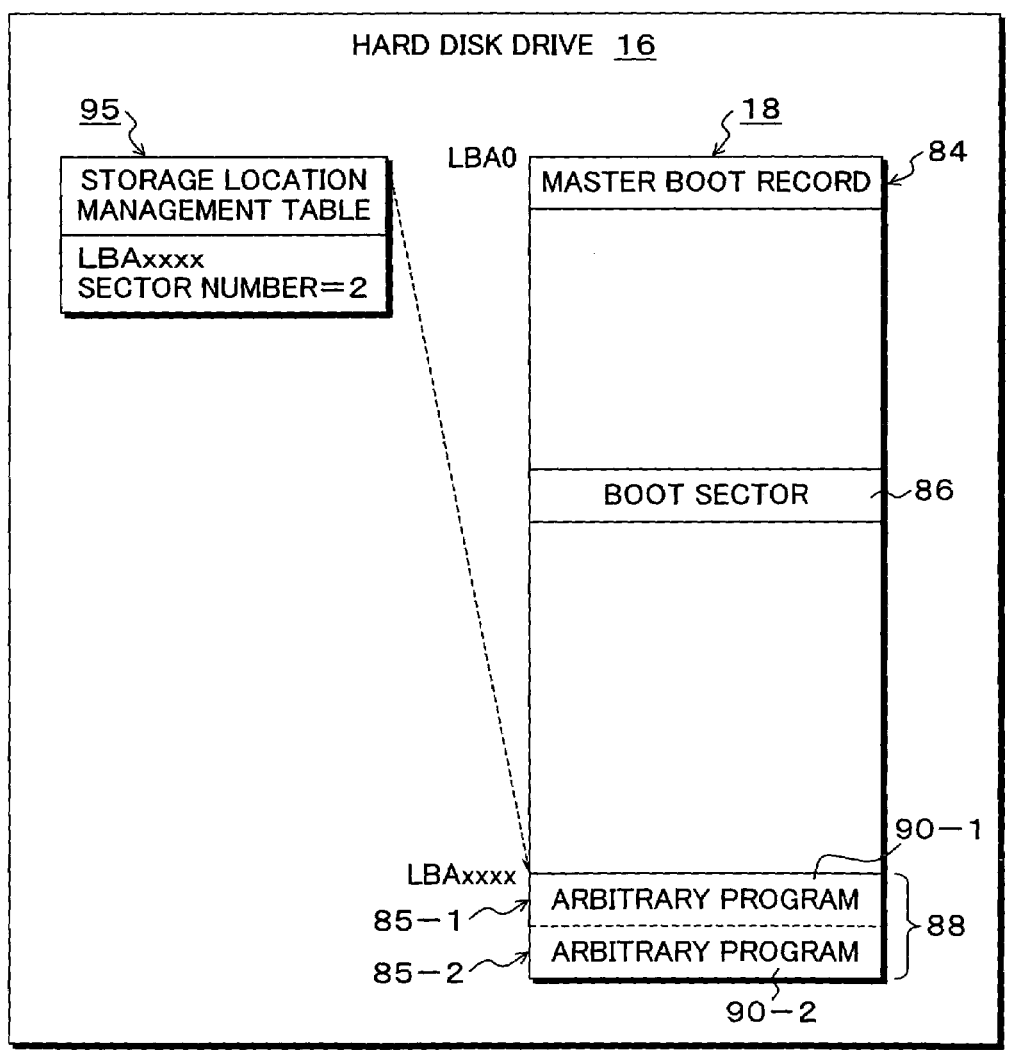
FIG. 16 is an explanatory diagram of a disk layout in which a storage location management table is provided in the drive.

FIG. 16 is an explanatory diagram of a disk layout in the case in which a storage location management table of arbitrary programs is provided in the hard disk drive side. The provisional startup sectors 85 of FIG. 7, FIG. 9, and FIG. 10 have a size of one sector comprising 512 bytes that is same as that of the startup sector at LBA0, and an arbitrary program exceeding one sector can be stored by providing a plurality of provisional startup sectors. In the case of FIG. 16, two sectors of provisional startup sectors 85-1 and 85-2 are provided in the OS-inaccessible sector 88 of the disk storage medium 18, and arbitrary programs 90-1 and 90-2 are stored therein, respectively. When the arbitrary programs 90-1 and 90-2 are stored in the plurality of provisional startup sectors 85-1 and 85-2 in this manner, a storage location management table 95 is disposed in the hard disk drive 16, thereby managing the logical block address LBAxxxx of the provisional startup sector 85-1 and the sector number=2. In this case, when a readout request of the startup sector 84 at LBA0 is first received upon power-on of the personal computer, the storage location management table 95 is referenced; it is recognized that the sector number of provisional startup sectors comprises two sectors; a response to a first readout request of the startup sector 84 is made by reading out the first provisional startup sector 85-1 storing the arbitrary program 90-1; and a response to a second readout request of the startup sector is made by reading out the second provisional startup sector 85-2 storing the arbitrary program 90-2.

Figure 17:
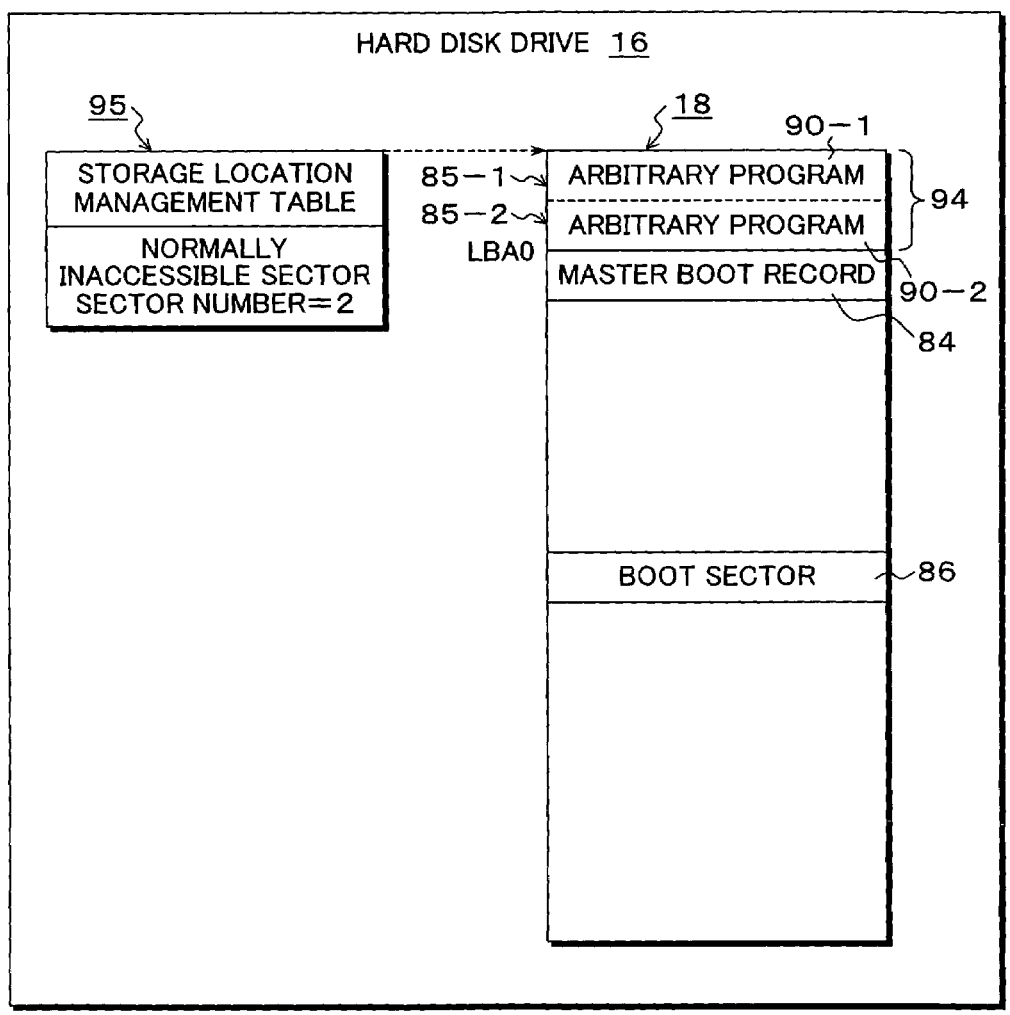
FIG. 17 is an explanatory diagram of another disk layout in which a storage location management table is provided in the drive.

In the case of FIG. 17, two provisional startup sectors 85-1 and 85-2 are prepared in the system area 94 of the disk storage medium 18, and the arbitrary programs 90-1 and 90-2 are stored therein. Also in this case, the system area 94 serving as a normally inaccessible sector and the sector number=2 thereof are managed by registering them in the storage location management table 95.

Figure 18:
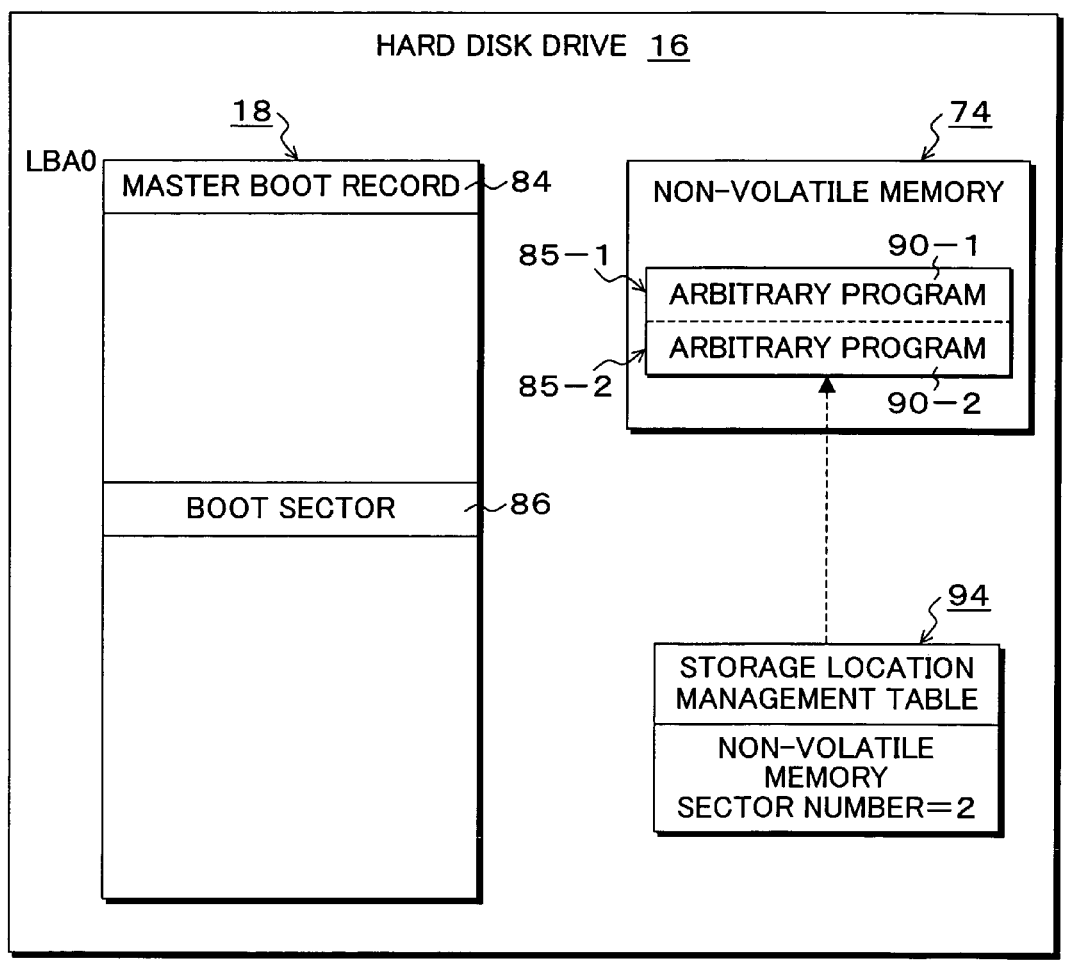
FIG. 18 is an explanatory diagram of another disk layout in which a storage location management table is provided in the drive.

In the case of FIG. 18, the provisional startup sectors of arbitrary programs are disposed in the non-volatile memory 74. In this case, the provisional startup sectors 85-1 and 85-2 corresponding to two sectors are disposed in the non-volatile memory 74, thereby storing the arbitrary programs 90-1 and 90-2, and management is carried out by registering in the storage location management table 95 that the storage location is the non-volatile memory 74 and the sector number=2.

Figure 19:
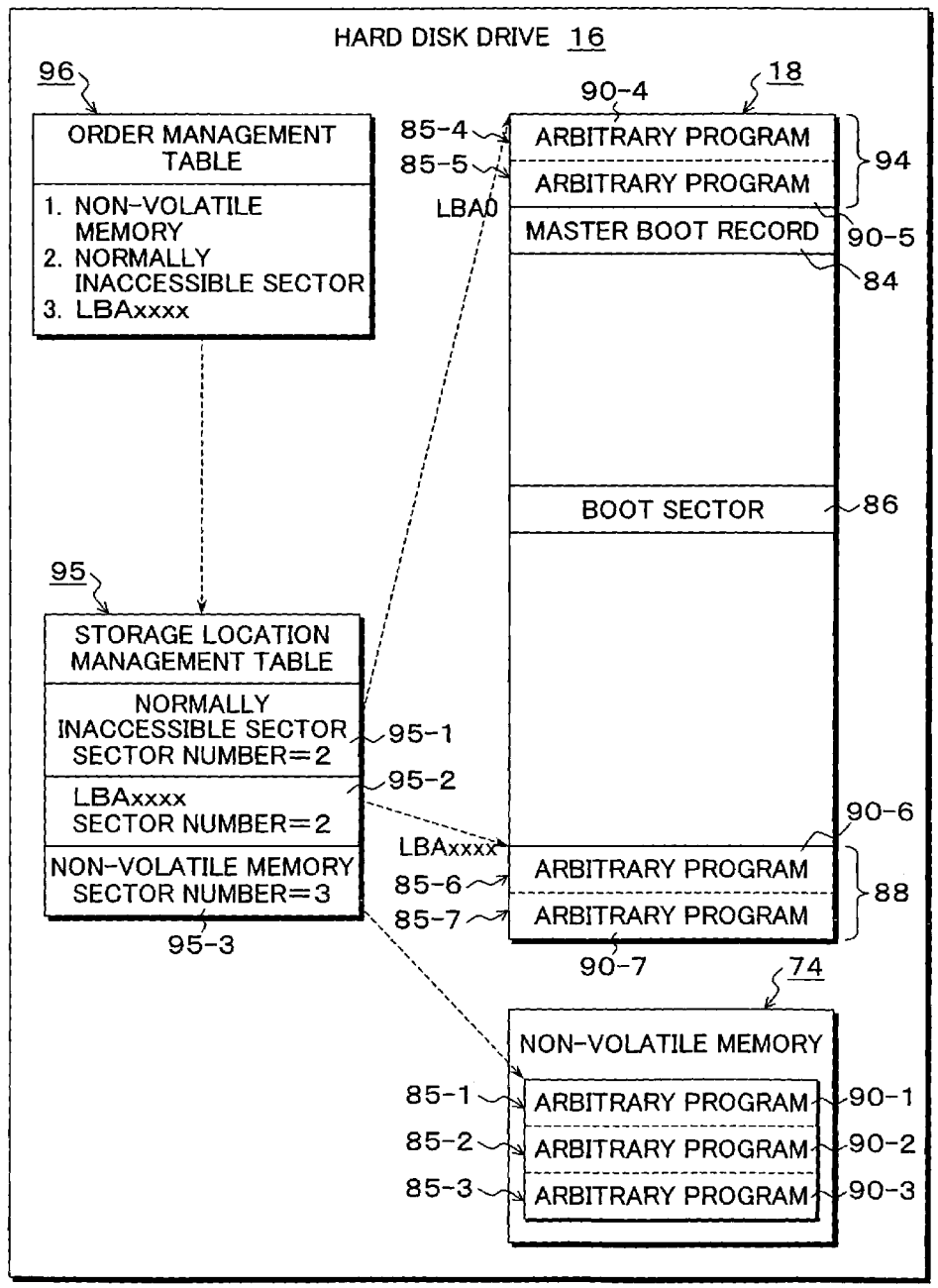
FIG. 19 is an explanatory diagram of a disk layout in which a storage location management table and an order management table are provided in the drive.

In the case of FIG. 19, provisional startup sectors 85-1 to 85-7 are disposed in the OS-inaccessible sector 88, the system area 94, and the non-volatile memory 74 of the disk storage medium 18, and arbitrary programs 90-1 to 90-7 are stored therein, respectively. In this case, an order management table 96 is disposed in the hard disk drive 16, so as to register the order of the storage locations of the arbitrary programs. At the same time, the storage location management table 95 is provided, wherein areas 95-1 to 95-3 are respectively provided for the areas at different positions so as to register the disposed sector number of each storage location. When such order management table 96 and the storage location management table 95 are employed in combination, for example, the provisional startup sectors 85-1 to 85-7 are prepared for, for example, three different areas, and in this example, arbitrary programs corresponding to seven sectors are stored such that they can be sequentially read out and executed before OS start-up.

Figure 20:
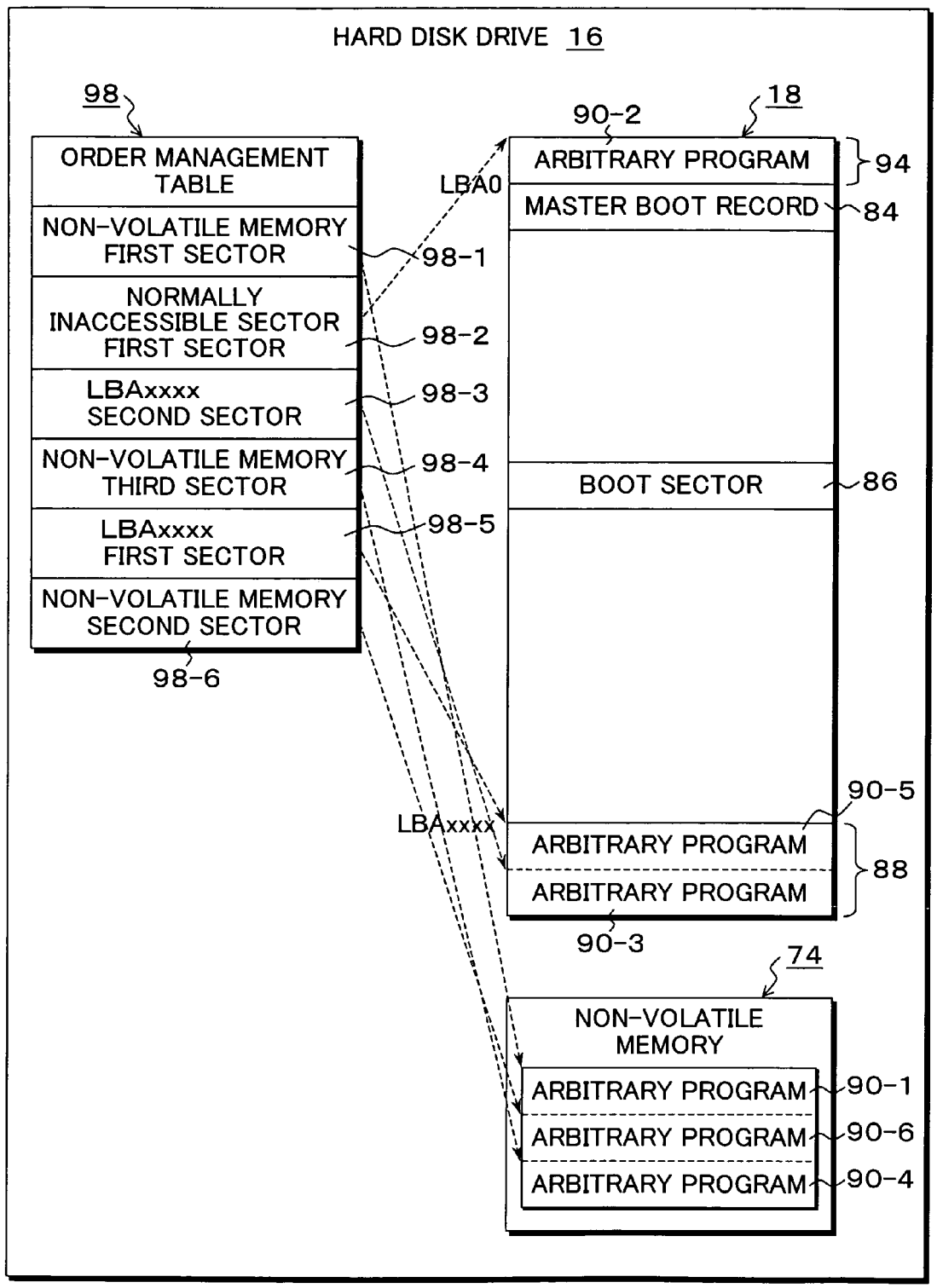
FIG. 20 is an explanatory diagram of a disk layout in which an order management table indicating storage location and order is provided in the drive.

FIG. 20 is an explanatory diagram of a disk layout in which an order management table indicating storage locations and the order is provided in the hard disk drive 16. In FIG. 20, in the hard disk drive 16, provisional startup sectors for storing arbitrary programs are prepared such that two sectors are in the OS-inaccessible sector 88 of the disk storage medium 18, one sector is in the system area 94, and three sectors are in the non-volatile memory, thereby storing arbitrary programs 90-1 to 90-6. An order management table 98 is prepared for the storage state of such arbitrary programs 90-1 to 90-6. The order management table 98 has storage order areas 98-1 to 98-6, and a storage location and the corresponding sector number are registered in each of them. That is, in the table item 98-1, it is indicated that the arbitrary program 90-1 in the first provisional startup sector of the non-volatile memory 73 is the first; in the order management table 98-2, it is indicated that the arbitrary program 90-2 in the first provisional startup sector of the system area 94, which is a normally inaccessible area, is the second; and thereafter, the arbitrary programs 90-3 to 90-6 are registered. When an arbitrary program(s) is stored in the plurality of provisional startup sectors of FIG. 16 to FIG. 20 and executed before OS start-up, the storage location management table 95 or the order management table 96 or 98 is referenced every time a readout request of the startup sector at LBA0 is received, readout response of the provisional startup sectors is repeated until the readout response of the last arbitrary program is completed, and if there is no more subsequent provisional startup sector of which readout has not been finished, a response to the readout request of the startup sector at the time is made by reading out the master boot record from the original startup sector at LBA0. Herein, the case in which an arbitrary program(s) is stored in a plurality of provisional startup sectors includes a case in which one arbitrary program is divided and stored in a plurality of provisional startup sectors, and a case in which a plurality types of arbitrary programs are distributed over a plurality of provisional startup sectors so as to be stored therein. Since one program can be divided into a plurality of provisional startup sectors, an arbitrary program exceeding the size of the startup sector storing the startup program, i.e., 514 bytes can be also executed before the OS. Furthermore, different programs such as a password authentication program, an encryption key generation program, and a biometric authentication program such as those shown in FIG. 13, FIG. 14, and FIG. 15 may be divided and stored in a plurality of provisional startup sectors and executed before OS start-up.

Figure 21:
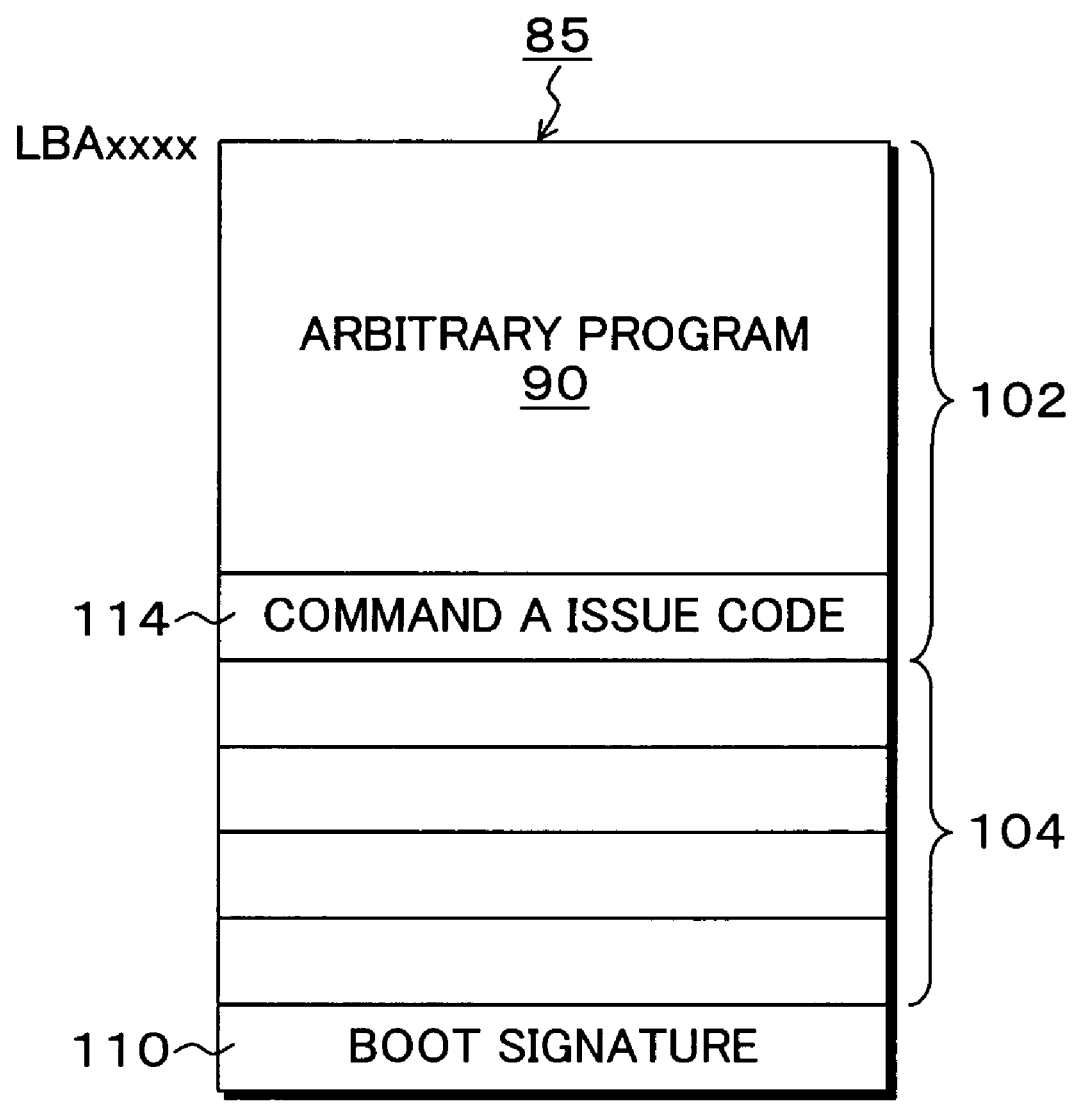
FIG. 21 is an explanatory diagram of an arbitrary program provided with a command A issue code.

FIG. 21 is an explanatory diagram of an arbitrary program provided with a code for issuing a command A for switching from readout of a provisional startup sector to the original startup sector. When the arbitrary program is to be executed before OS start-up, in some cases, depending on the BIOS 12, reading of the startup sector at LBA0 is performed several times before the arbitrary program is executed. In such cases, if the arbitrary program is distributed over plural sectors so as to be stored therein, and if a response to a readout request of the startup sector of a second time or later is made by reading out the original startup sector at LBA0, the arbitrary program may not be executed. In order to prevent this, a command A issue code 114 is provided at the end of the arbitrary program 90 as shown in FIG. 21; when the command A issue code 114 is executed, a command A for switching from the provisional startup sector to the actual startup sector is issued; and at the stage when the arbitrary program is executed and the command A is issued according to the command A issue code 114, the hard disk drive side can return the data of the actual startup sector at LBA0.

Figure 22A:
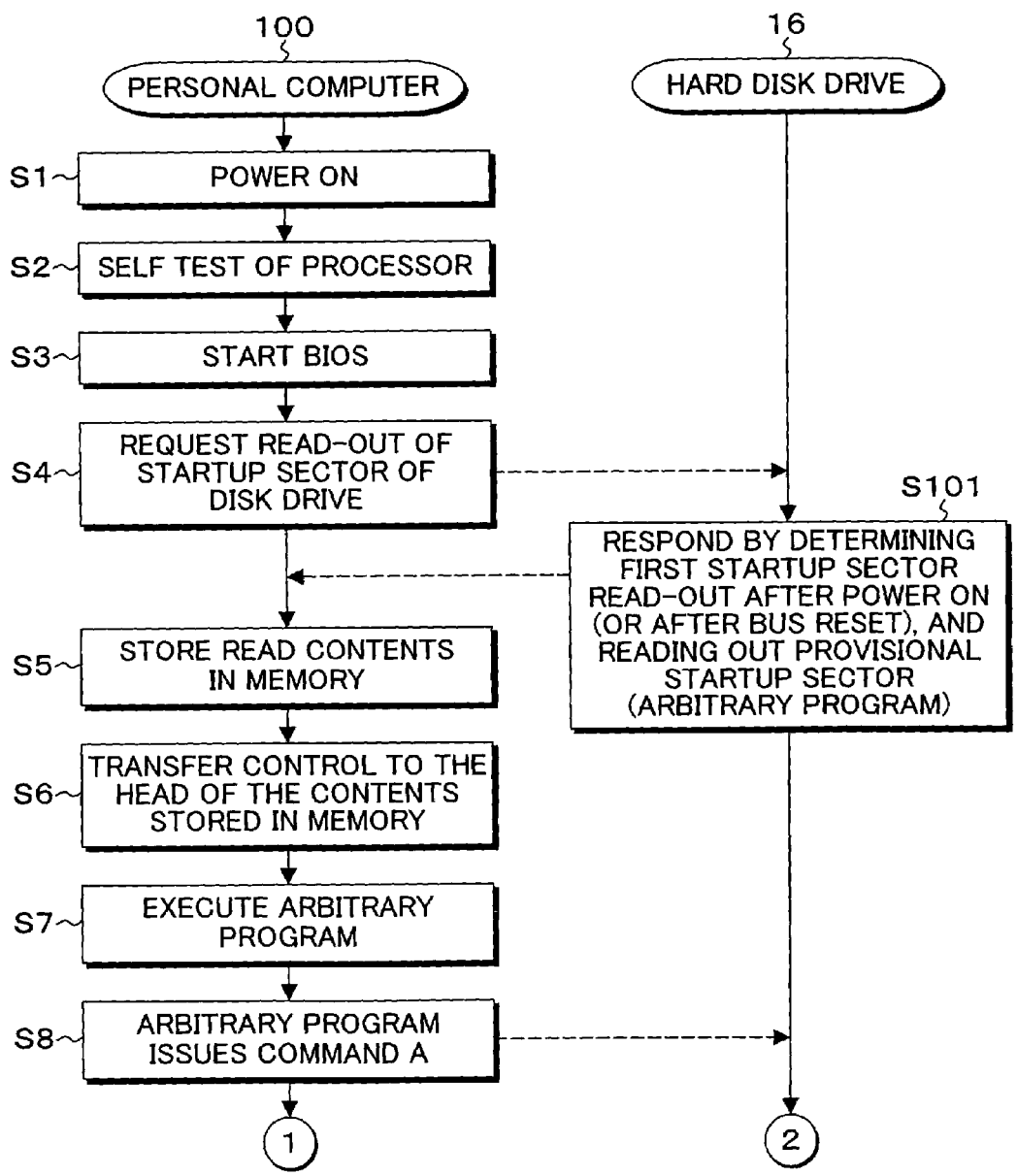
FIGS. 22A and 22B are time charts of a control process according to the present invention for switching from readout of a provisional startup sector to readout of a startup sector at LBA0 by means of a command A.
Figure 22B:
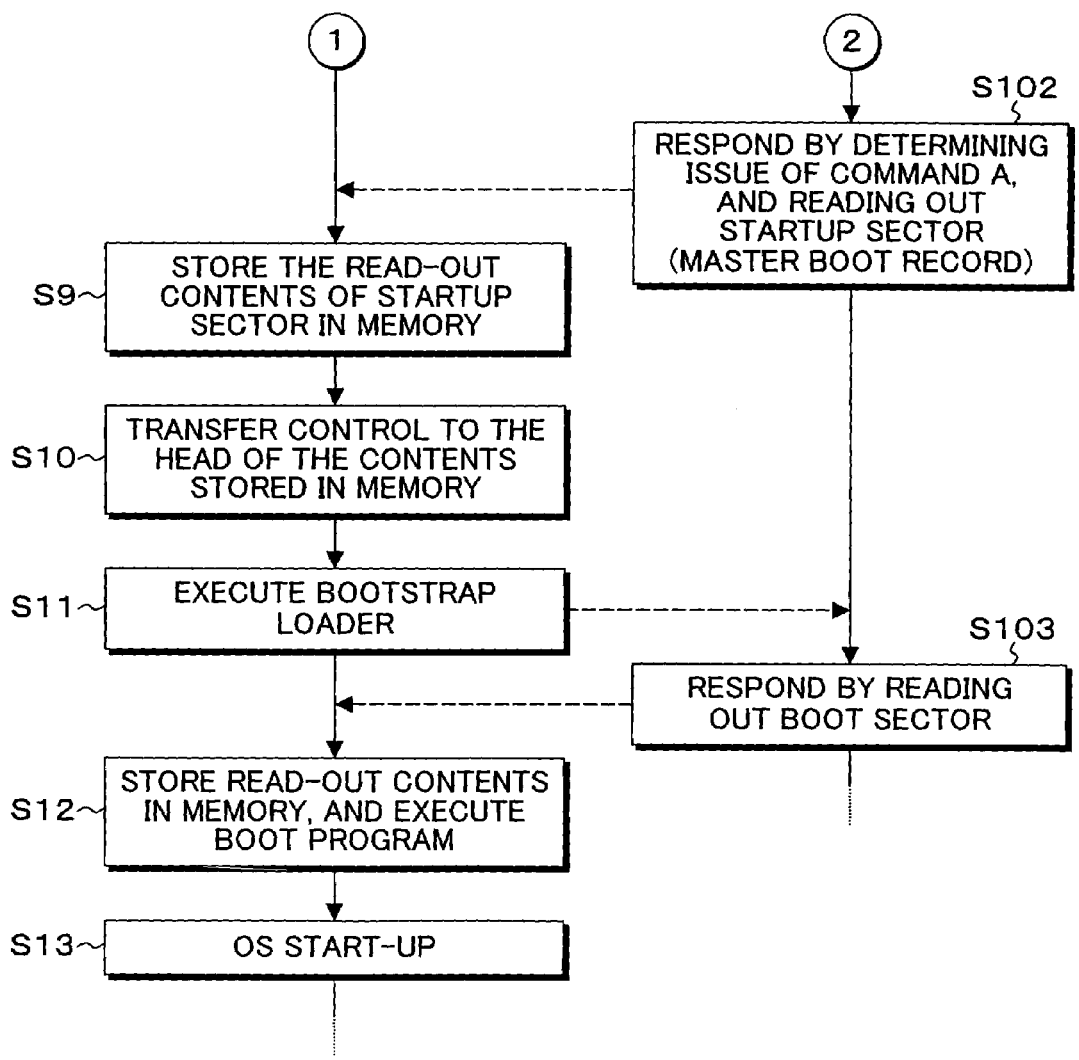

FIGS. 22A and 22B are flow charts of control according to the present invention for switching from readout of an arbitrary program to readout of the original startup sector at LBA0 by means of the command A. In FIGS. 22A and 22B, the processes of the steps S1 to S7 of the personal computer 100 and the step S101 of the hard disk drive 16 are same as that of the time charts of FIGS. 11A and 11B; however, when the arbitrary program is executed in the step S7, the command A issue code 114 of FIG. 21 is executed at the end, and the arbitrary program issues a command A in a step S8. In response to the issue of the command A, in a step S102, the hard disk drive 16 determines the issue of the command A, and responds by reading out the master boot record in the startup sector at LBA0. It should be noted that the processes of a step S9 and thereafter are same as that of FIGS. 11A and 11B.

Figure 23:
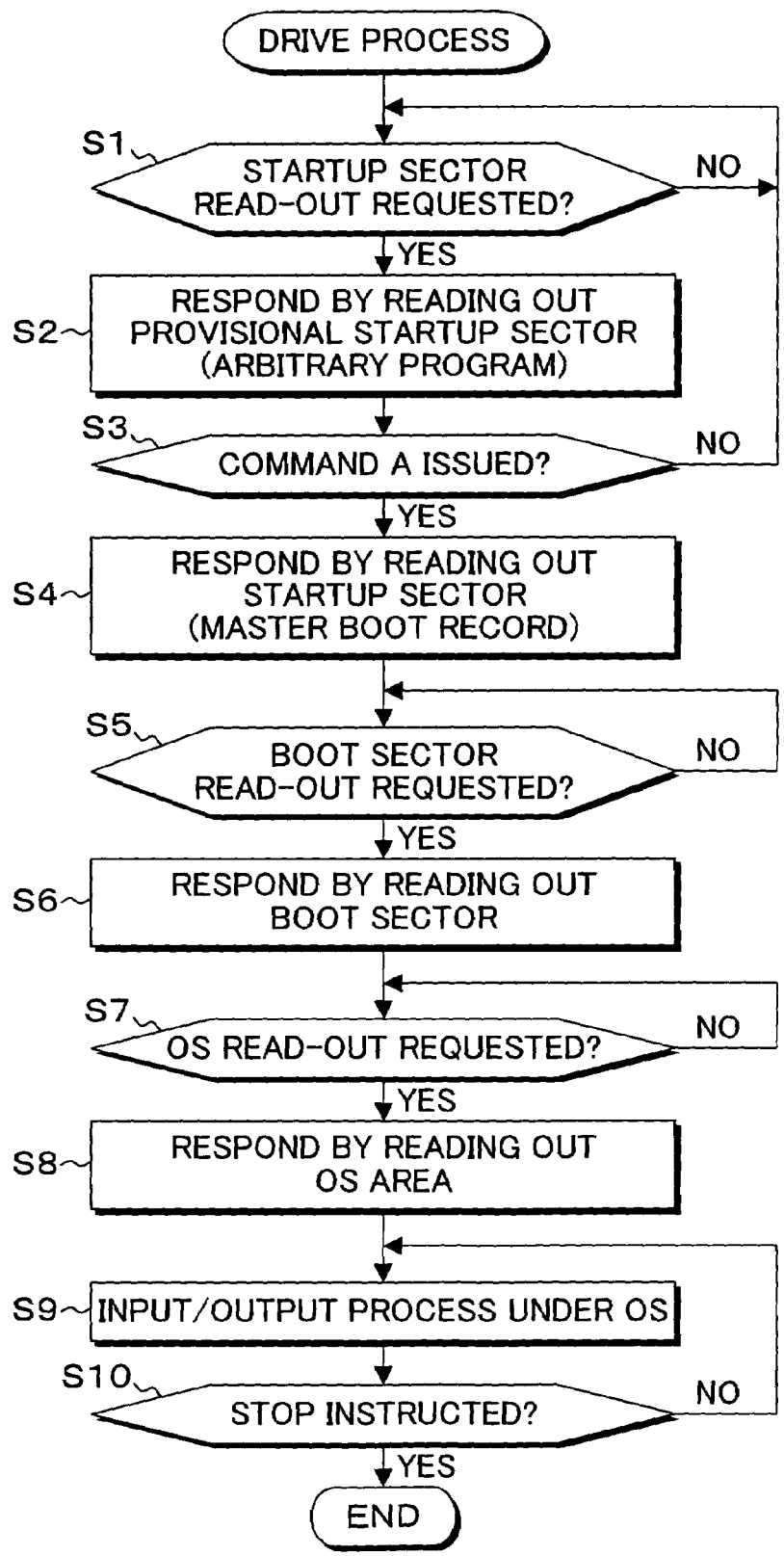
FIG. 23 is a flow chart of a drive process corresponding to the control process of FIGS. 22A and 22B.

FIG. 23 is a flow chart of a control process of the hard disk drive corresponding to the control process of FIGS. 22A and 22B. In FIG. 23, when the readout request of the startup sector at LBA0 is determined in a step S1, the process of making a response by reading out an arbitrary program from a provisional startup sector in a step S2 is repeated. Herein, if issue of the command A is determined in a step S3, the process proceeds to a step S4 wherein a response is made by reading out the master boot record from the startup sector at LBA0. The processes of steps S5 to S10 are same as that of the steps S5 to S10 of FIG. 12.

Figure 24:
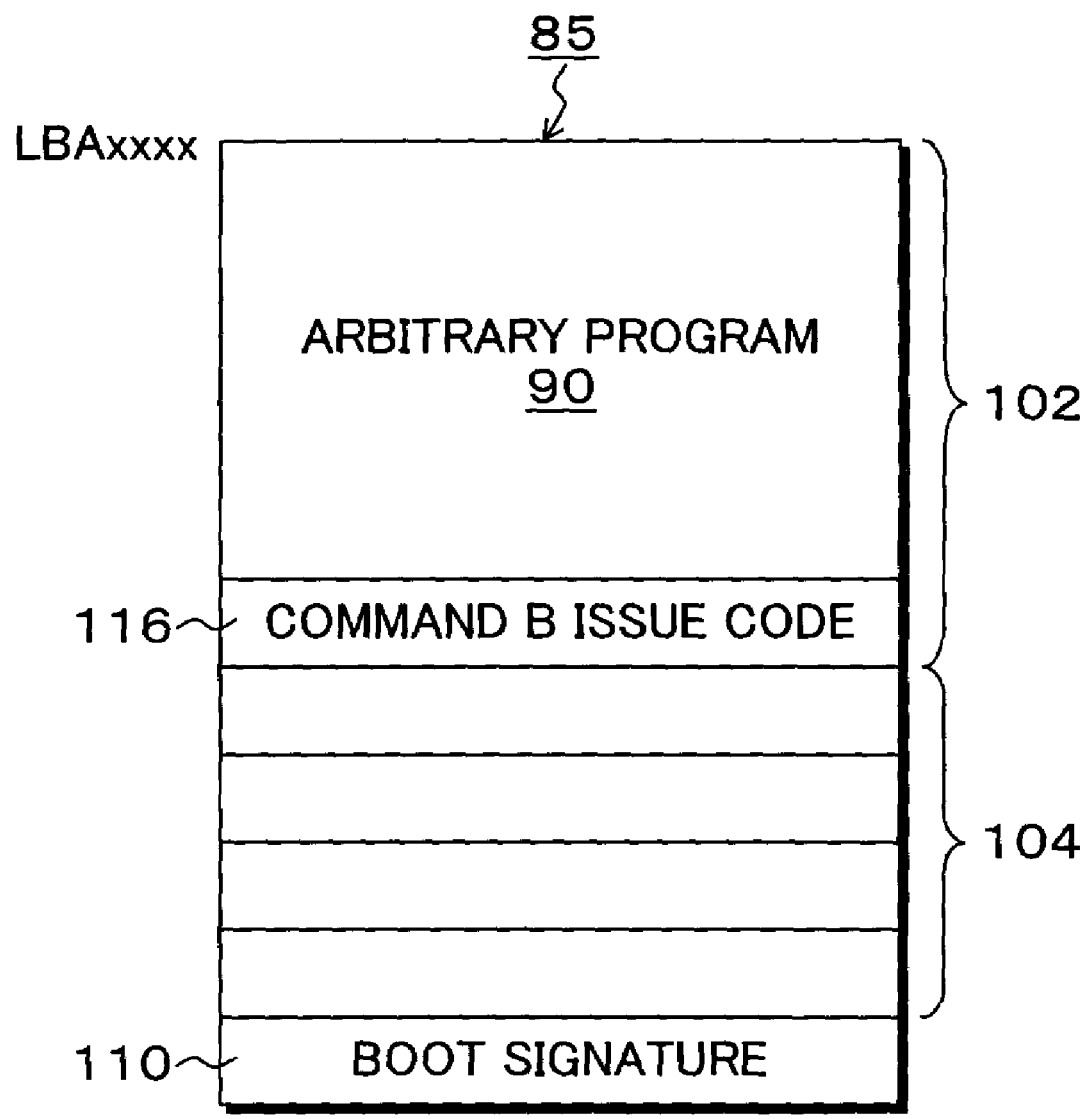
FIG. 24 is an explanatory diagram of an arbitrary program provided with a command B issue code.

FIG. 24 is an explanatory diagram of an arbitrary program which is configured to issue a command B dedicated to readout of an arbitrary program from a second or later provisional startup sector in a case in which an arbitrary program(s) is stored in plural sectors. In FIG. 24, the arbitrary program 90 stored in the program area 102 of the provisional startup sector 85 stores a command B issue code 116 at the end. When the arbitrary program 90 is read out into the memory and executed, the command B issue code 116 issues a command B to the hard disk drive, wherein the command B is a dedicated command for instructing a readout response of a subsequent provisional startup sector. When the command B is employed in combination with the command A shown in FIG. 21, readout of an arbitrary program(s) stored in a plurality of provisional startup sectors can be reliably carried out. That is, with respect to a plurality of arbitrary programs stored in a plurality of provisional startup sectors, the command B issue code 116 is stored, as shown in FIG. 24, in each of the arbitrary programs except for the last one, and the last arbitrary program stores the command A issue code 114 of FIG. 21. Accordingly, every time the plurality of provisional startup sectors is subjected to readout and an arbitrary program is executed, the command B is issued according to the command B issue code 116 thereby carrying out a response of reading out the provisional startup sector storing the subsequent arbitrary program, and if the last arbitrary program is executed, the command A is issued thereby carrying out a response of reading out the master boot record of the original startup sector at LBA0 according to the issue of the command A.

Figure 25B:
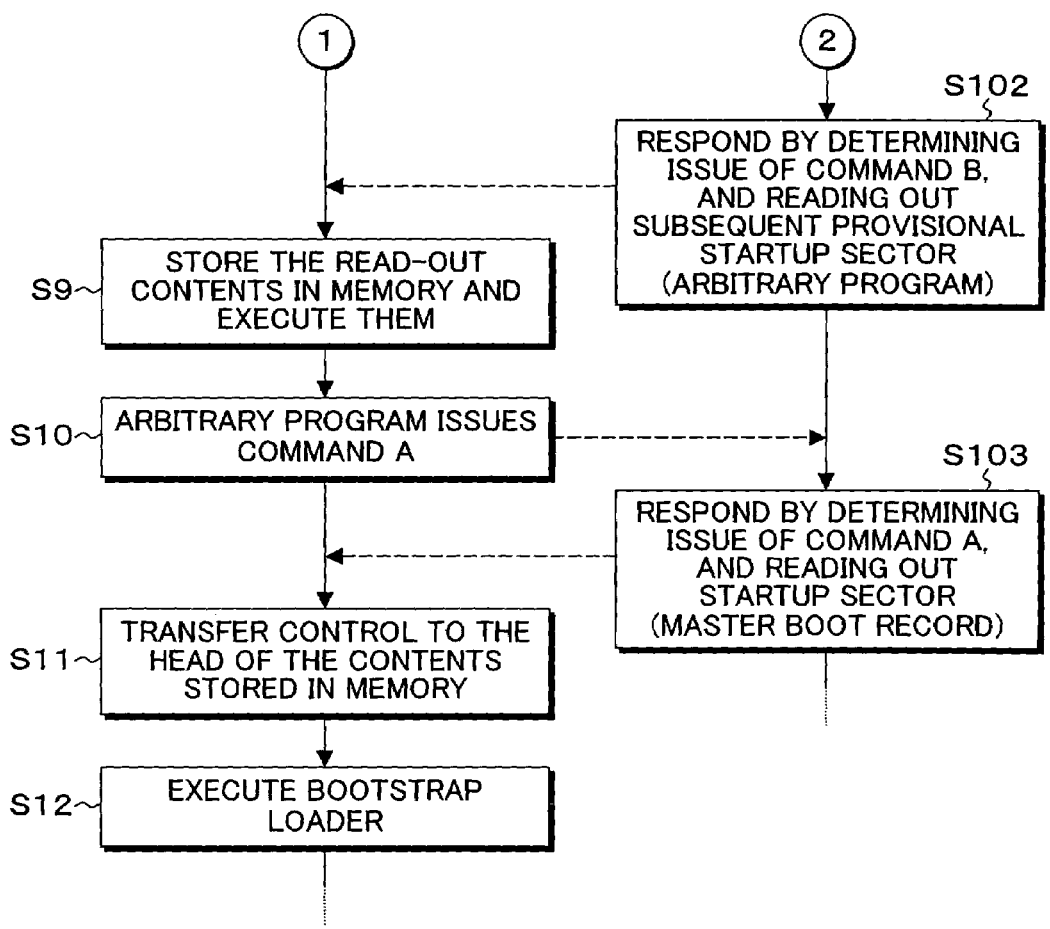

FIGS. 25A and 25B are time charts of the control process according to the present invention for reading out the provisional startup sector storing a subsequent arbitrary program by means of a command B, and switching to readout of the original startup sector at LBA0 by means of a command A. In FIGS. 25A and 25B, the processes of steps S1 to S7 of the personal computer 100 and a step S101 of the hard disk drive 16 are same as that of the time chart of FIGS. 11A and 11B. However, at the end of the arbitrary program of the first provisional startup sector subjected to readout response in the step S101, the command B issue code 116 is included as shown in FIG. 24. Therefore, when the command B issue code 116 is executed at the end in the step S7, the arbitrary program issues a command B in a step S8. The hard disk drive 16 determines the issue of the command B, and responds by reading out the provisional startup sector storing a subsequent arbitrary program in a step S102. If the command A issue code 114 has been described in the arbitrary program such as that of FIG. 21, in a step S9, after the readout contents are stored in the memory and executed, the command A is lastly executed, thereby issuing a command A in a step S10. The hard disk drive 16 determines the issue of the command A in a step S103, and responds by reading out the original startup sector storing the master boot record at LBA0. Then, control is transferred to the master boot record stored in the memory, i.e., the head of the bootstrap loader in a step S11, the bootstrap loader is executed in a step S12, and, thereafter, start-up of the OS is carried out in the manner shown in the steps S12 and S13 of FIGS. 11A and 11B.

Figure 26B:
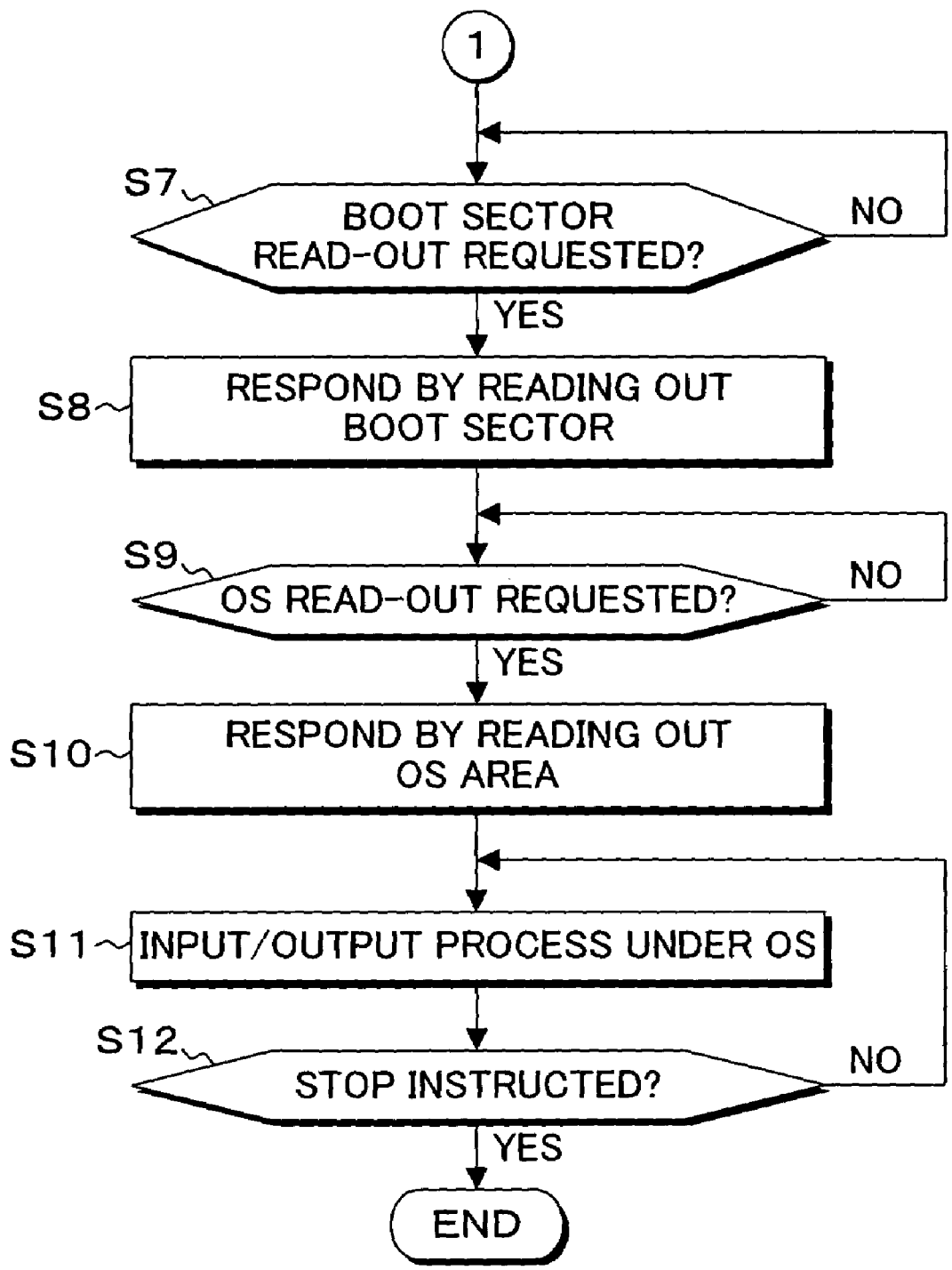

FIGS. 26A and 26B are flow charts of a drive process of the hard disk drive corresponding to the control process of FIGS. 25A and 25B. In FIGS. 26A and 26B, in the drive process, if a readout request of the startup sector at LBA0 is determined in a step S1, a response is made by reading out a provisional startup sector storing an arbitrary program in a step S2. Subsequently, whether or not a command B is issued is checked in a step S3, and if issue of a command B is determined, a response is made by reading out a provisional startup sector storing a subsequent arbitrary program in a step S4. If issue of a command B is not found in a step S3, a command A is subjected to determination in a step S5. If issue of a command A is determined, the process proceeds to a step S6, wherein a response is made by reading out the original startup sector storing the master boot record at LBA0, thereby starting up the OS. It should be noted that steps S7 to S12 are same as the steps S5 to S10 of FIG. 12.

Figure 27A:
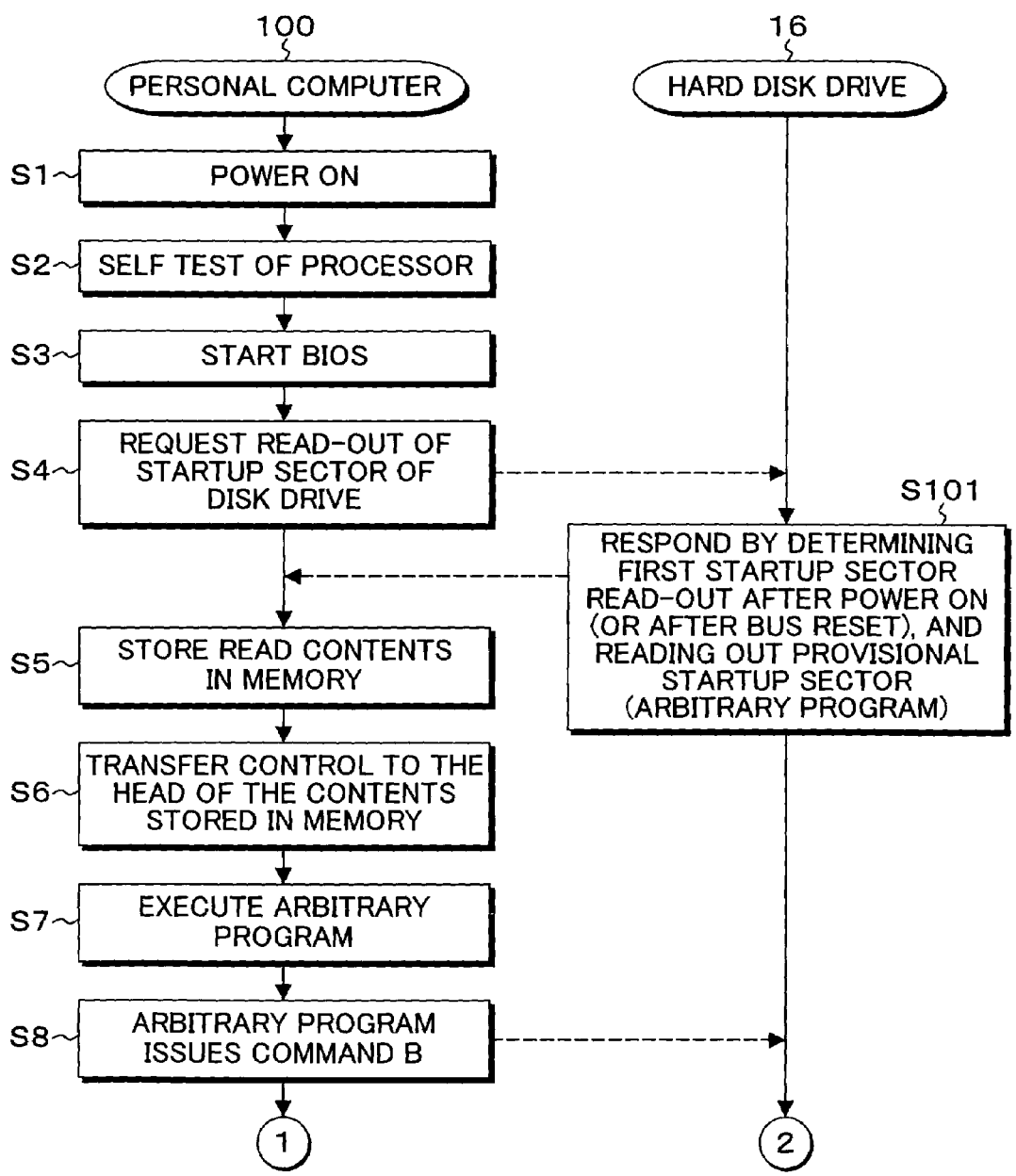
FIGS. 27A and 27B are time charts of a control process according to the present invention for reading out a subsequent provisional startup sector and switching to readout of the startup sector at LBA0 only by means of a command B.
Figure 27B:
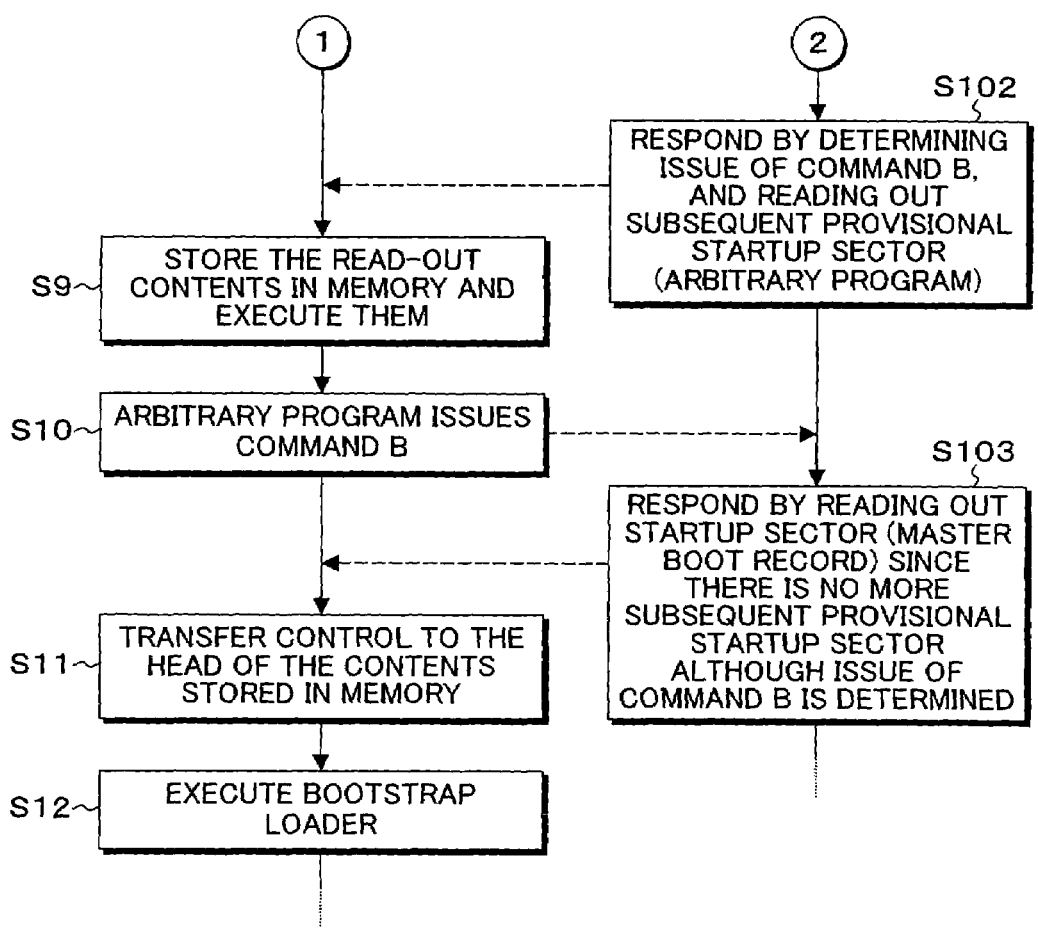

FIGS. 27A and 27B are flow charts of a control process of the present invention for, only by means of a command(s) B, reading out a provisional startup sector storing a subsequent arbitrary program, and if readout of provisional startup sectors storing arbitrary programs is finished, switching to readout of the original startup sector at LBA0. In FIGS. 27A and 27B, steps S1 to S10 of the personal computer 100 and steps S101 and 102 of the hard disk drive 16 are same as that of FIGS. 25A and 25B. That is, if an arbitrary program is executed in a step S7, according to the command B issue code 116 at the end, the arbitrary program issues a command B in a step S8, and the hard disk drive 16 responds by reading out the provisional startup sector storing a subsequent arbitrary program in a step S102. In response to this, the personal computer 100 stores the readout contents in the memory and executes the arbitrary program in a step S9, and according to the command B issue code 116 at the end, the arbitrary program issues a command B in a step S10. The hard disk drive 16 determines the issue of the command B in a step S103, however, if there is no provisional startup sector storing a subsequent arbitrary program, determines this, and responds by reading out the original startup sector storing the master boot record at LBA0. By virtue of such processes, switching between the readout of the provisional startup sector storing an arbitrary program and the readout of the original startup sector storing the master boot record at LBA0 can be carried out only with the command B. It should be noted that start-up of the OS according to arbitrary programs in a step S11 and after that is same as the process of the steps S12 and S13 of FIGS. 11A and 11B.

Figure 28A:
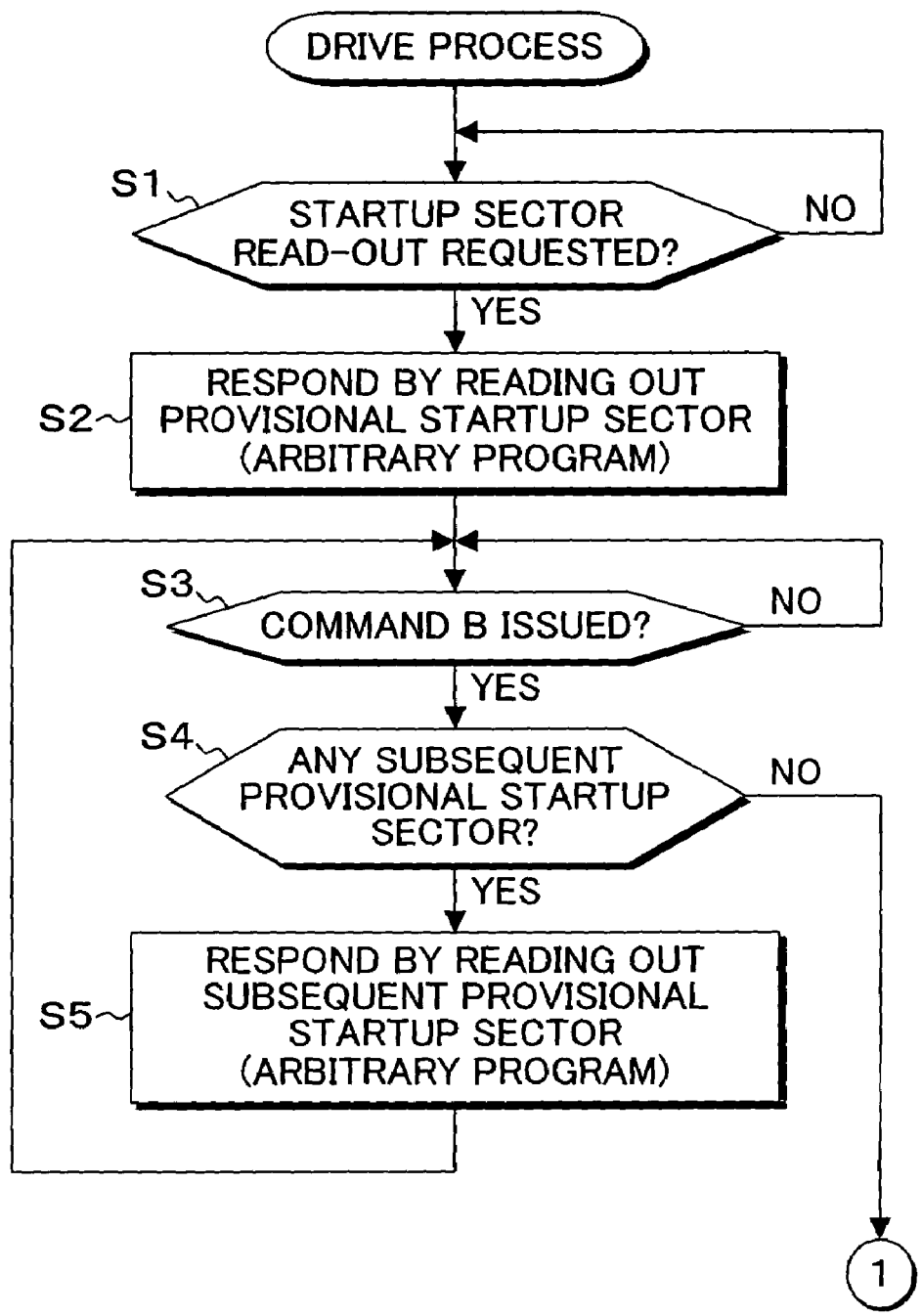
FIGS. 28A and 28B are flow charts of a drive process corresponding to control process of FIGS. 26A and 26B.
Figure 28B:
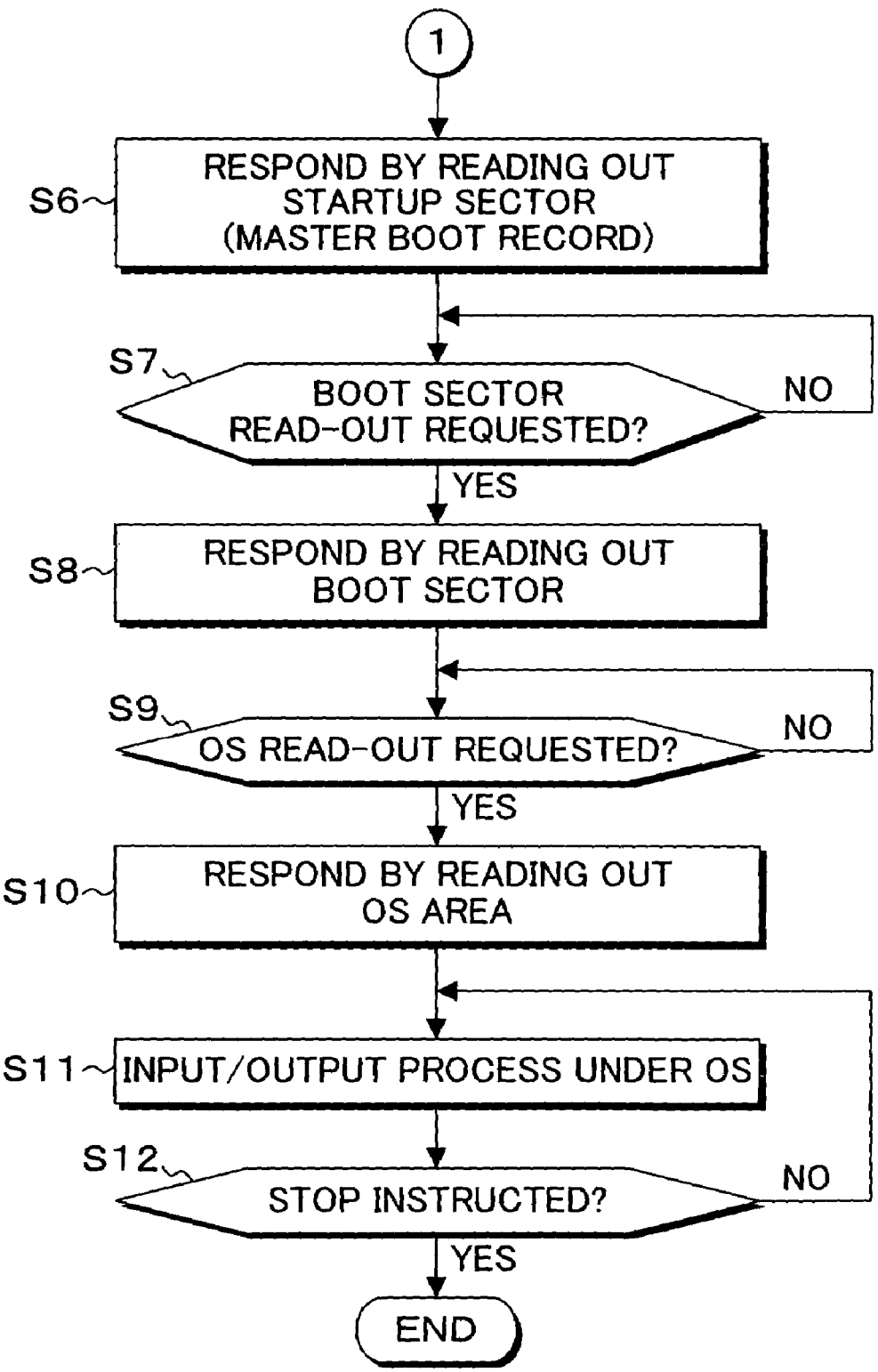

FIGS. 28A and 28B are flow charts of a drive process of the hard disk drive corresponding to the control process of FIGS. 26A and 26B. In FIGS. 28A and 28B, if a readout request of the startup sector at LBA0 is determined, a response is made by reading out a provisional startup sector storing an arbitrary program in a step S2. Subsequently, issue of a command B is checked in a step S3, and if issue of a command B is determined, the process proceeds to a step S4, wherein whether or not there is a subsequent provisional startup sector is checked. If there is a subsequent provisional startup sector, the process proceeds to a step S5 in which a response is made by reading out the subsequent provisional startup sector storing an arbitrary program. If it is determined that there is no subsequent provisional startup sector in a step S4, the process proceeds to a step S6 wherein a response is made by reading out the original startup sector storing the master boot record at LBA0. Steps S7 to S12 are same as the steps S5 to S10 of FIG. 12. It is desirable that the arbitrary program(s) of the present invention written in the provisional startup sector(s) stored in the disk storage medium or the non-volatile memory is configured such that it cannot be easily rewritten. In order to achieve this, in the hard disk drive 16, a normal write request to the provisional startup sector(s) is processed such that it fails. In this case, a dedicated command for a write to the provisional startup sector is prepared, and it is configured such that only a write with a notice of the dedicated command is permitted, so that the arbitrary program stored in the provisional startup sector cannot be easily rewritten. Moreover, the present invention provides programs executed in the processor 62 of the hard disk drive 16, each of which comprises the contents of the flow chart of FIG. 12, FIG. 23, FIG. 26A, FIG. 26B, FIG. 28A, or FIG. 28B. Note that, although the above described embodiments employed, as an example, the hard disk drive 16 as the startup drive, other than that, any of the floppy (R) disk drive 20, the MO disk drive 24, the CD-ROM drive 28, and the USB drive 32, which are input/output devices provided in the personal computer 100 of FIG. 5, may be specified as the startup drive. For example, if the floppy (R) disk drive 20 is specified as the startup disk, a difference resides in that the startup sector at LBA0 of a floppy (R) disk serves as the boot sector, and, except for this, execution of an arbitrary program(s) before OS start-up according to the disposition of provisional startup sectors is same as the case of the hard disk drive. When any of the MO disk drive 24, the CD-ROM drive 28, and the USB drive 32 is specified as the startup drive, either the disposition of the startup program same as that of the hard disk drive or the disposition of the startup program same as that of the floppy (R) disk drive can be employed, and also in this case, execution of an arbitrary program(s) before OS start-up can be implemented in the same manner as the case of the hard disk drive. Moreover, the present invention includes arbitrary modifications that do not impair the objects and the advantages thereof, and is not limited by the numerical values described in the above described embodiments.

What is claimed is:

1. A startup program execution method comprising
   a pre-startup process step of responding to a first read request from an upper-level system to a storage medium of a device by reading out, instead of a startup sector of the storage medium storing a startup program, a provisional startup sector storing an arbitrary program so as to execute the arbitrary program; and
   a startup step of responding to a subsequent read request from the upper-level system according to execution of the arbitrary program by reading out the startup sector, and starting up an OS by executing the startup program.

2. The method according to claim 1, wherein the arbitrary program stores a code for reading out the startup sector when execution thereof is finished, deploying it in a memory, and transferring control to the head part thereof.

3. The method according to claim 1, wherein the provisional startup sector storing the arbitrary program is disposed in a particular area of a storage medium which is inaccessible from an OS, a system area of the storage medium which can be accessed only from the device, or an area of a non-volatile memory provided in the device.

4. The method according to claim 1, wherein the startup program is a bootstrap loader, which is stored in a startup sector of a storage medium and corresponding to PC/AT compatible, and a boot program enabled in a partition startup sector specified by the bootstrap loader; or the startup program is a boot program stored in a boot sector serving as a startup sector of a storage medium.

5. The method according to claim 1, wherein, if the arbitrary program is divided and stored in a plurality of provisional startup sectors disposed in a single area of the device, in the pre-startup process step, the disposed number of the provisional startup sectors is managed, and responses to a plurality of readout requests from an upper-level system are made by sequentially reading out the provisional startup sectors as much as the disposed number so as to execute the arbitrary program.

6. The method according to claim 1, wherein, if the arbitrary program is divided and stored in a plurality of provisional startup sectors disposed in different areas of the device, in the pre-startup process step, the order of the provisional startup sectors is managed, and responses to a plurality of readout requests from the upper-level system after the power is turned on are made by reading out the plurality of provisional startup sectors in accordance with the managed order so as to execute the arbitrary program.

7. The method according to claim 6, wherein, in the pre-startup process step, furthermore, a plurality of provisional startup sectors are disposed in each of the different areas of the device and the disposed number is managed, and responses to a plurality of readout requests from the upper-level system are made by sequentially reading out the provisional startup sectors as much as the disposed number in each of the different disposed areas so as to execute the arbitrary program.

8. The method according to any of claims 5 to 7, wherein the arbitrary programs stored in the plurality of provisional startup sectors are divided programs of one arbitrary program, or a plurality types of arbitrary programs.

9. The method according to claim 1, wherein, if the arbitrary program is divided and stored in a plurality of provisional startup sectors,
   the arbitrary program issues a command for requesting readout of the startup sector when execution thereof is finished; and,
   in the startup step, when the command from the upper-level system is received after the readout response according to the pre-startup process step, a response is made by reading out the startup sector so as to execute the startup program.

10. The method according to claim 1, wherein, if the arbitrary program is divided and stored in a plurality of provisional startup sectors,
    the arbitrary program issues a command for requesting readout of a subsequent provisional startup sector when execution thereof is finished;
    in the pre-startup process step, after a response to a first read request from an upper-level system after the power is turned on is made by reading out the provisional startup sector at the head, a response is made when the command from the upper-level system is received by reading out a subsequent provisional startup sector; and,
    in the startup step, when the command is received, it is determined that there is no subsequent provisional startup sector so as to make a response by reading out the startup sector.

11. The method according to claim 1, wherein, if the arbitrary program is divided and stored in a plurality of provisional startup sectors,
    each of the plurality of arbitrary programs except for the last one issues a first command for requesting readout of a subsequent arbitrary program when execution thereof is finished, and the last arbitrary program issues a second command for requesting readout of the startup sector when execution thereof is finished;
    in the pre-startup process step, after a response to a first read request from an upper-level system after the power is turned on is made by reading out the provisional startup sector at the head, a response is made when the first command from the upper-level system is received by reading out a subsequent provisional startup sector; and,
    in the startup step, when the second command from the upper-level system with respect to a readout response according to the pre-startup process step is received, a response is made by reading out the startup sector.

12. The method according to claim 1, wherein, in the pre-startup process step, when a response to a first read request from an upper-level system after the power is turned on is made by reading out the provisional startup sector storing the arbitrary program, a response is made by copying a partition table from the startup sector.

13. The method according to claim 1, wherein the device includes a drive that further includes a disk drive and a memory drive.

14. A device for accessing a storage medium according to an instruction from an upper-level system comprising
- a pre-startup process unit for responding to a first read request from an upper-level system by reading out, instead of a startup sector of the storage medium storing a startup program, a provisional startup sector storing an arbitrary program so as to execute the arbitrary program; and
- a startup unit for responding to a subsequent read request from the upper-level system according to execution of the arbitrary program by reading out the startup sector, and starting up an OS by executing the startup program.

15. The device according to claim 14, wherein the arbitrary program stores a code for reading out the startup sector when execution thereof is finished, deploying it in a memory, and transferring control to the head part thereof.

16. The device according to claim 14, wherein the provisional startup sector storing the arbitrary program is disposed in a particular area of a storage medium which is inaccessible from an OS, a system area of the storage medium which can be accessed only from the device, or an area of a non-volatile memory provided in the device.

17. A storage medium storing a program for causing a computer of a device for accessing a storage medium in response to an instruction of an upper-level system, wherein said program allows a computer to execute:
- a pre-startup process step of responding to a first read request from an upper-level system by reading out, instead of a startup sector storing a startup program, a provisional startup sector storing an arbitrary program so as to execute the arbitrary program; and
- a startup step of responding to a subsequent read request from the upper-level system according to execution of the arbitrary program by reading out the startup sector, and starting up an OS by executing the startup program.

18. The storage medium storing the program according to claim 17, wherein the startup program is a bootstrap loader, which is stored in a startup sector of a storage medium and corresponding to PC/AT compatible, and a boot program enabled in a partition startup sector specified by the bootstrap loader; or the startup program is a boot program stored in a boot sector serving as a startup sector of a storage medium.

* * * * *